United States Patent
Yoon et al.

(10) Patent No.: US 10,594,536 B2
(45) Date of Patent: Mar. 17, 2020

(54) METHOD AND USER EQUIPMENT FOR TRANSMITTING RANDOM ACCESS PREAMBLE, AND METHOD AND BASE STATION FOR RECEIVING RANDOM ACCESS PREAMBLE

(71) Applicant: LG ELECTRONICS INC., Seoul (KR)

(72) Inventors: Sukhyon Yoon, Seoul (KR); Hyunsoo Ko, Seoul (KR); Kijun Kim, Seoul (KR); Eunsun Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/065,079

(22) PCT Filed: Mar. 19, 2018

(86) PCT No.: PCT/KR2018/003169
§ 371 (c)(1),
(2) Date: Oct. 2, 2018

(87) PCT Pub. No.: WO2018/174494
PCT Pub. Date: Sep. 27, 2018

(65) Prior Publication Data
US 2019/0158337 A1    May 23, 2019

Related U.S. Application Data

(60) Provisional application No. 62/474,053, filed on Mar. 20, 2017.

(51) Int. Cl.
*H04L 27/26* (2006.01)
*H04W 74/08* (2009.01)
(Continued)

(52) U.S. Cl.
CPC .......... *H04L 27/2692* (2013.01); *H04L 5/00* (2013.01); *H04L 27/26* (2013.01);
(Continued)

(58) Field of Classification Search
CPC .......... H04W 74/006; H04W 36/0077; H04L 5/0053
See application file for complete search history.

(56) References Cited

U.S. PATENT DOCUMENTS

2017/0006637 A1* 1/2017 Sahlin ................. H04W 74/004
2018/0167979 A1 6/2018 Guo et al.
(Continued)

FOREIGN PATENT DOCUMENTS

JP       2010041473    2/2010
KR    1020080112077    12/2008
(Continued)

OTHER PUBLICATIONS

PCT International Application No. PCT/KR2018/003169, Notification of Transmittal of the International Search Report and the Written Opinion of the International Searching Authority, or Declaration dated Jun. 25, 2018, 11 pages.
(Continued)

*Primary Examiner* — Romani Ohri
(74) *Attorney, Agent, or Firm* — Lee Hong Degerman Kang Waimey

(57) ABSTRACT

A UE transmits a random access channel (RACH) preamble and a BS receives the RACH channel. The BS configures the RACH preamble to align boundaries of the RACH preamble with boundaries of OFDM symbols on which the RACH preamble is configured in the time domain. The UE generates/transmits the RACH preamble to align the boundaries
(Continued)

of the RACH preamble with the boundaries of OFDM symbols on which the RACH preamble is configured in the time domain.

16 Claims, 16 Drawing Sheets

(51) Int. Cl.
*H04L 5/00* (2006.01)
*H04B 7/08* (2006.01)
(52) U.S. Cl.
CPC ...... *H04L 27/2605* (2013.01); *H04L 27/2646* (2013.01); *H04L 27/2666* (2013.01); *H04W 74/08* (2013.01); *H04W 74/0841* (2013.01); *H04B 7/086* (2013.01)

(56) References Cited

U.S. PATENT DOCUMENTS

2018/0220466 A1* 8/2018 Park ................ H04W 74/0833
2018/0375698 A1* 12/2018 Zhang ................ H04W 74/006

FOREIGN PATENT DOCUMENTS

| KR | 1020120093994 | 8/2012 |
| KR | 101597634 | 2/2016 |
| KR | 1020160037069 | 4/2016 |

OTHER PUBLICATIONS

3rd Generation Partnership Project (3GPP), "Technical Specification Group Radio Access Network; Evolved Universal Terrestrial Radio Access (E-UTRA); Physical channels and modulation (Release 12)," 3GPP TS 36.211 V12.6.0, Jun. 2015, 136 pages.
NTT Docomo, "NR PRACH design", 3GPP TSG RAN WG1 Meeting #88, R1-1702830, Feb. 2017, 11 pages.
Catt, "On NR RACH Preamble Design", 3GPP TSG RAN WG1 AH_NR Meeting, R1-1700184, Jan. 2017, 7 pages.
Qualcomm, "PRACH design consideration", 3GPP TSG RAN WG1 NR AdHoc, R1-1700790, Jan. 2017, 19 pages.
Ericsson, "NR PRACH design", 3GPP TSG RAN WG1 Meeting #88, R1-1702127, Feb. 2017, 20 pages.
Samsung, "RACH preamble design", 3GPP TSG RAN WG1 NR Meeting #88, R1-1702908, Feb. 2017, 11 pages.
ZTE, et al., "PRACH Design Considerations", 3GPP TSG RAN WG1 Meeting #88, R1-1701580, Feb. 2017, 13 pages.
Samsung, et al., "WF on RACH preamble format", 3GPP TSG RAN WG1 Meeting #88, R1-1703741, Feb. 2017, 3 pages.
U.S. Appl. No. 16/274,008 Office Action dated May 6, 2019, 10 pages.
3rd Generation Partnership Project; Technical Specification Group Radio Access Network; Study on New Radio (NR) Access Technology Physical Layer Aspects (Release 14), 3GPP TR 38.802 V1.2.0, Feb. 2017, 82 pages.
3rd Generation Partnership Project; Technical Specification Group Radio Access Network; Evolved Universal Terrestrial Radio Access (E-UTRA); Physical channels and modulation (Release 13), 3GPP TS 36.211 V13.1.0, Mar. 2016, 169 pages.

* cited by examiner

METHOD AND USER EQUIPMENT FOR TRANSMITTING RANDOM ACCESS PREAMBLE, AND METHOD AND BASE STATION FOR RECEIVING RANDOM ACCESS PREAMBLE

CROSS-REFERENCE TO RELATED APPLICATIONS

This application is the National Stage filing under 35 U.S.C. 371 of International Application No. PCT/KR2018/003169, filed on Mar. 19, 2018, which claims the benefit of U.S. Provisional Application No. 62/474,053, filed on Mar. 20, 2017, the contents of which are all hereby incorporated by reference herein in their entirety.

TECHNICAL FIELD

The present invention relates to a wireless communication system. More particularly, the present invention relates to a method and apparatus for transmitting/receiving a random access preamble.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

As more communication devices have demanded higher communication capacity, there has been necessity of enhanced mobile broadband (eMBB) relative to legacy radio access technology (RAT). In addition, massive machine type communication (mMTC) for providing various services anytime and anywhere by connecting a plurality of devices and objects to each other is one main issue to be considered in future-generation communication.

Further, a communication system to be designed in consideration of services/UEs sensitive to reliability and latency is under discussion. The introduction of future-generation RAT has been discussed by taking into consideration eMBB communication, mMTC, ultra-reliable and low-latency communication (URLLC), and the like.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, a signal transmission/reception method is required in the system supporting new radio access technologies using high frequency bands.

The technical objects that can be achieved through the present invention are not limited to what has been particularly described hereinabove and other technical objects not described herein will be more clearly understood by persons skilled in the art from the following detailed description.

Technical Solution

According to an aspect of the present disclosure, provided herein is a method of transmitting a random access channel (RACH) preamble by a user equipment in a wireless communication system. The method includes: generating the RACH preamble; and transmitting the RACH preamble. A a length $N_{RA}$ of the RACH preamble is equal to a total length of orthogonal frequency division multiplexing (OFDM) symbols used to transmit the RACH preamble and the RACH preamble includes a sequence part having a length $N_{SEQ}=N_u*n$ and a cyclic prefix (CP) having a length $N_{CP,RA}$ satisfying $N_{CP,RA}+N_{SEQ}=N_{RA}$. The sequence part includes n preambles, each preamble having a length $N_u$ and n being a positive integer.

According to another aspect of the present invention, provided herein is a method of receiving a random access channel (RACH) preamble by a base station in a wireless communication system. The method includes transmitting RACH preamble configuration information; and receiving the RACH preamble according to the RACH preamble configuration information. A length $N_{RA}$ of the RACH preamble is equal to a total length of orthogonal frequency division multiplexing (OFDM) symbols used to receive the RACH preamble and the RACH preamble includes a sequence part having a length $N_{SEQ}=N_u*n$ and a cyclic prefix (CP) having a length $N_{CP,RA}$ satisfying $N_{CP,RA}+N_{SEQ}=N_{RA}$. The sequence part includes n preambles, each preamble having a length $N_u$ and n being a positive integer.

According to another aspect of the present invention, provided herein is a user equipment for transmitting a random access channel (RACH) preamble in a wireless communication system. The user equipment includes a radio frequency (RF) unit, and a processor configured to control the RF unit. The processor may be configured to: generate the RACH preamble; and control the RF unit to transmit the RACH preamble. A length $N_{RA}$ of the RACH preamble is equal to a total length of orthogonal frequency division multiplexing (OFDM) symbols used to transmit the RACH preamble and the RACH preamble includes a sequence part having a length $N_{SEQ}=N_u*n$ and a cyclic prefix (CP) having a length $N_{CP,RA}$ satisfying $N_{CP,RA}+N_{SEQ}=N_{RA}$. The sequence part includes n preambles, each preamble having a length $N_u$ and n being a positive integer.

According to another aspect of the present invention, provided herein is a base station for receiving a random access channel (RACH) preamble in a wireless communication system. The base station includes a radio frequency (RF) unit, and a processor configured to control the RF unit. The processor is configured to: control the RF unit to transmit RACH preamble configuration information; and control the RF unit to receive the RACH preamble according to the RACH preamble configuration information. A length $N_{RA}$ of the RACH preamble is equal to a total length of orthogonal frequency division multiplexing (OFDM) symbols used to receive the RACH preamble and the RACH preamble includes a sequence part having a length $N_{SEQ}=N_u*n$ and a cyclic prefix (CP) having a length $N_{CP,RA}$ satisfying $N_{CP,RA}+N_{SEQ}=N_{RA}$. The sequence part includes n preambles, each preamble having a length $N_u$ and n being a positive integer.

In each aspect of the present invention, the RACH preamble may span the OFDM symbols from start to end of the OFDM symbols in the time domain.

In each aspect of the present invention, $N_u$ may be a fixed value.

In each aspect of the present invention, the RACH preamble may be generated to comply with a random access preamble format.

In each aspect of the present invention, information indicating the random access preamble format may be provided to the user equipment from the base station.

In each aspect of the present invention, the wireless communication system may be a system to which beamforming per OFDM symbol is applicable.

In each aspect of the present invention, the RACH preamble may be transmitted/received on a cell operating in a high frequency band.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, uplink/downlink signals can be efficiently transmitted/received. Therefore, overall throughput of a radio communication system can be improved.

According to an embodiment of the present invention, delay/latency occurring during communication between a user equipment and a base station may be reduced.

In addition, owing to development of smart devices, it is possible to efficiently transmit/receive not only a small amount of data but also data which occurs infrequently.

Moreover, signals can be transmitted/received in the system supporting new radio access technologies.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

MODE FOR CARRYING OUT THE INVENTION

Figure 1:
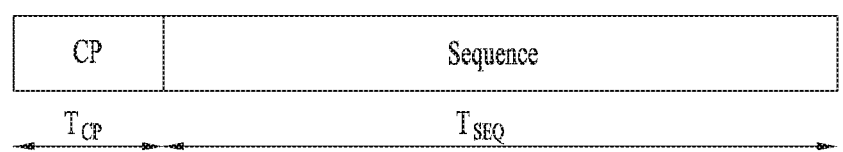
FIG. 1 illustrates a random access preamble format in a legacy LTE/LTE-A system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP based communication system, e.g. LTE/LTE-A, NR. However, the technical features of the present invention are not limited thereto. For example, although the following detailed description is given based on a mobile communication system corresponding to a 3GPP LTE/LTE-A/NR system, aspects of the present invention that are not specific to 3GPP LTE/LTE-A/NR are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In embodiments of the present invention described below, the term "assume" may mean that a subject to transmit a channel transmits the channel in accordance with the corresponding "assumption". This may also mean that a subject to receive the channel receives or decodes the channel in a form conforming to the "assumption", on the assumption that the channel has been transmitted according to the "assumption".

In the present invention, puncturing a channel on a specific resource means that the signal of the channel is mapped to the specific resource in the procedure of resource mapping of the channel, but a portion of the signal mapped to the punctured resource is excluded in transmitting the channel. In other words, the specific resource which is punctured is counted as a resource for the channel in the procedure of resource mapping of the channel, a signal mapped to the specific resource among the signals of the channel is not actually transmitted. The receiver of the channel receives, demodulates or decodes the channel, assuming that the signal mapped to the specific resource is not transmitted. On the other hand, rate-matching of a channel on a specific resource means that the channel is never mapped to the specific resource in the procedure of resource mapping of the channel, and thus the specific resource is not used for transmission of the channel. In other words, the rate-matched resource is not counted as a resource for the channel in the procedure of resource mapping of the channel. The receiver of the channel receives, demodulates, or decodes the channel, assuming that the specific rate-matched resource is not used for mapping and transmission of the channel.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Particularly, a BS of a UTRAN is referred to as a Node-B, a BS of an E-UTRAN is referred to as an eNB, and a BS of a new radio access technology network is referred to as a gNB. In describing the present invention, a BS will be referred to as a gNB.

In the present invention, a node refers to a fixed point capable of transmitting/receiving a radio signal through communication with a UE. Various types of gNBs may be used as nodes irrespective of the terms thereof. For example, a BS, a node B (NB), an e-node B (eNB), a pico-cell eNB (PeNB), a home eNB (HeNB), gNB, a relay, a repeater, etc. may be a node. In addition, the node may not be a gNB. For example, the node may be a radio remote head (RRH) or a radio remote unit (RRU). The RRH or RRU generally has a lower power level than a power level of a gNB. Since the RRH or RRU (hereinafter, RRH/RRU) is generally connected to the gNB through a dedicated line such as an optical cable, cooperative communication between RRH/RRU and the gNB can be smoothly performed in comparison with cooperative communication between gNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with a gNB or a node which provides a communication service to the specific cell. In addition, a DL/UL signal of a specific cell refers to a DL/UL signal from/to a gNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between a gNB or node which provides a communication service to the specific cell and a UE. In the 3GPP based communication system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node.

Meanwhile, a 3GPP based communication system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP communication standards use the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). The carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

3GPP based communication standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs.

Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/ data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of a gNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, therefore, the terms DMRS and UE-RS are used to refer to RSs for demodulation.

For terms and technologies which are not described in detail in the present invention, reference can be made to the standard document of 3GPP LTE/LTE-A, for example, 3GPP TS 36.211, 3GPP TS 36.212, 3GPP TS 36.213, 3GPP TS 36.321, and 3GPP TS 36.331 and the standard document of 3GPP NR, for example, 3GPP TS 38.211, 3GPP TS 38.212, 3GPP 38.213, 3GPP 38.214, 3GPP 38.215, 3GPP TS 38.321, and 3GPP TS 36.331.

In an LTE/LTE-A system, when a UE is powered on or desires to access a new cell, the UE perform an initial cell search procedure including acquiring time and frequency synchronization with the cell and detecting a physical layer cell identity $N^{cell}_{ID}$ of the cell. To this end, the UE may receive synchronization signals, for example, a primary synchronization signal (PSS) and a secondary synchronization signal (SSS), from an eNB to thus establish synchronization with the eNB and acquire information such as a cell identity (ID). After the initial cell search procedure, the UE may perform a random access procedure to complete access to the eNB. To this end, the UE may transmit a preamble through a physical random access channel (PRACH) and receive a response message to the preamble through a PDCCH and a PDSCH. After performing the aforementioned procedures, the UE may perform PDCCH/PDSCH reception and PUSCH/PUCCH transmission as a normal UL/DL transmission procedure. The random access procedure is also referred to as a random access channel (RACH) procedure. The random access procedure is used for various purposes including initial access, adjustment of UL synchronization, resource assignment, and handover.

After transmitting the RACH preamble, the UE attempts to receive a random access response (RAR) within a preset time window. Specifically, the UE attempts to detect a PDCCH with a random access radio network temporary identifier (RA-RNTI) (hereinafter, RA-RNTI PDCCH) (e.g., CRC is masked with RA-RNTI on the PDCCH) in the time window. In detecting the RA-RNTI PDCCH, the UE checks the PDSCH corresponding to the RA-RNTI PDCCH for presence of an RAR directed thereto. The RAR includes timing advance (TA) information indicating timing offset information for UL synchronization, UL resource allocation information (UL grant information), and a temporary UE identifier (e.g., temporary cell-RNTI (TC-RNTI)). The UE may perform UL transmission (of, e.g., Msg3) according to the resource allocation information and the TA value in the RAR. HARQ is applied to UL transmission corresponding to the RAR. Accordingly, after transmitting Msg3, the UE may receive acknowledgement information (e.g., PHICH) corresponding to Msg3.

FIG. 1 illustrates a random access preamble format in a legacy LTE/LTE-A system.

In the legacy LTE/LTE-A system, a random access preamble, i.e., an RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu sequence, the length of the root sequence, and a preamble format, which are to be used for an RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4).

TABLE 1

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0-3 and 4, respectively.

TABLE 2

| Logical root sequence number | Physical root sequence number u (in increasing order of the corresponding logical sequence number) |
|---|---|
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |

TABLE 2-continued

| Logical root sequence number | Physical root sequence number u (in increasing order of the corresponding logical sequence number) |
|---|---|
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence nunther u (in increasing order of the corresponding logical sequence number) | | | | | | | | | | | | | | | | | | | |
|---|---|---|---|---|---|---|---|---|---|---|---|---|---|---|---|---|---|---|---|---|
| 0~19 | 1 | 138 | 2 | 137 | 3 | 136 | 4 | 135 | 5 | 134 | 6 | 133 | 7 | 132 | 8 | 131 | 9 | 130 | 10 | 129 |
| 20~39 | 11 | 128 | 12 | 127 | 13 | 126 | 14 | 125 | 15 | 124 | 16 | 123 | 17 | 122 | 18 | 121 | 19 | 120 | 20 | 119 |
| 40~59 | 21 | 118 | 22 | 117 | 23 | 116 | 24 | 115 | 25 | 114 | 26 | 113 | 27 | 112 | 28 | 111 | 29 | 110 | 30 | 109 |
| 60~79 | 31 | 108 | 32 | 107 | 33 | 106 | 34 | 105 | 35 | 104 | 36 | 103 | 37 | 102 | 38 | 101 | 39 | 100 | 40 | 99 |
| 80~99 | 41 | 98 | 42 | 97 | 43 | 96 | 44 | 95 | 45 | 94 | 46 | 93 | 47 | 92 | 48 | 91 | 49 | 90 | 50 | 89 |
| 100~119 | 51 | 88 | 52 | 87 | 53 | 86 | 54 | 85 | 55 | 84 | 56 | 83 | 57 | 82 | 58 | 81 | 59 | 80 | 60 | 79 |
| 120~137 | 61 | 78 | 62 | 77 | 63 | 76 | 64 | 75 | 65 | 74 | 66 | 73 | 67 | 72 | 68 | 71 | 69 | 70 | — | — |
| 138~837 | N/A | | | | | | | | | | | | | | | | | | | | u-th root Zadoff-Chu sequence is defined by the following equation.

$$x_u(n) = e^{-j\frac{\pi u n(n+1)}{N_{ZC}}}, 0 \leq n \leq N_{ZC} - 1 \qquad \text{Equation 1}$$

The length $N_{ZC}$ of the Zadoff-Chu sequence is given by the following table.

TABLE 4

| Preamble format | $N_{ZC}$ |
|---|---|
| 0~3 | 839 |

From the u-th root Zadoff-Chu sequence, random access preambles with zero correlation zones of length $N_{ZC}-1$ are defined by cyclic shifts according to $x_{u,v}(n) = x_u((n+C_v) \bmod N_{ZC})$, where the cyclic shift is given by the following equation.

$$C_v = \begin{cases} vN_{CS} & v = 0, 1, \ldots, \lfloor N_{ZC}/N_{CS} \rfloor - 1, \quad N_{CS} \neq 0 \text{ for unrestricted sets} \\ 0 & N_{CS} = 0 \text{ for unrestricted sets} \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \bar{n}_{shift}^{RA} - 1 \text{ for restricted sets} \end{cases} \qquad \text{Equation 2}$$

$N_{CS}$ is given by Table 5 for preamble formats 0~3 and by Table 6 for preamble format 4.

TABLE 5

| zeroCorrelationZoneConfig | $N_{CS}$ value | |
|---|---|---|
| | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |

TABLE 6-continued

| zeroCorrelationZoneConfig | $N_{CS}$ value |
|---|---|
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used.

The variable $d_u$ is the cyclic shift corresponding to a Doppler shift of magnitude $1/T_{SEQ}$ and is given by the following equation.

$$d_u = \begin{cases} p & 0 \le p < N_{ZC}/2 \\ N_{ZC} - p & \text{otherwise} \end{cases} \quad \text{Equation 3}$$

p is the smallest non-negative integer that fulfils (pu) mod $N_{ZC}$=1. The parameters for restricted sets of cyclic shifts depend on $d_u$. For $N_{ZC} \le d_u < N_{ZC}/3$, the parameters are given by the following equation.

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor (N_{ZC} - 2d_u - n_{group}^{RA} d_{start})/N_{CS} \rfloor, 0) \quad \text{Equation 4}$$

For $N_{ZC}/3 \le d_u < (N_{ZC} - N_{CS})/2$, the parameters are given by the following equation.

$$n_{shift}^{RA} = \lfloor (N_{ZC} - 2d_u)/N_{CS} \rfloor$$

$$d_{start} = N_{ZC} - 2d_u + n_{shift}^{RA} N_{CS}$$

$$n_{group}^{RA} = \lfloor d_u/d_{start} \rfloor$$

$$\bar{n}_{shift}^{RA} = \min(\max(\lfloor (d_u - n_{group}^{RA} d_{start})/N_{DS} \rfloor, 0), n_{shift}^{RA}) \quad \text{Equation 5}$$

For all other values of $d_u$, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} \quad \text{Equation 6}$$

where $0 \le t < T_{SEQ} - T_{CP}$, $\beta_{PRACH}$ is an amplitude scaling factor in order to conform to the transmit power specified in 3GPP TS 36.211, and $k_0 = n_{PRB}^{RA} N_{sc}^{RB} - N_{RB}^{UL} N_{sc}^{RB}/2$. $N_{sc}^{RB}$ denotes the number of subcarriers constituting one resource block (RB). $N_{RB}^{UL}$ denotes the number of RBs in a UL slot and depends on a UL transmission bandwidth. The location in the frequency domain is controlled by the parameter $n_{PRB}^{RA}$ is derived from the section 5.7.1 of 3GPP TS 36.211. The factor $K = \Delta f/\Delta f_{RA}$ accounts for the difference in subcarrier spacing between the random access preamble and uplink data transmission. The variable $\Delta f_{RA}$, the subcarrier spacing for the random access preamble, and the variable $\varphi$, a fixed offset determining the frequency-domain location of the random access preamble within the physical resource blocks, are both given by the following table.

TABLE 7

| Preamble format | $\Delta f_{RA}$ | $\varphi$ |
|---|---|---|
| 0~3 | 1250 Hz | 7 |
| 4 | 7500 Hz | 2 |

In the LTE/LTE-A system, a subcarrier spacing $\Delta f$ is 15 kHz or 7.5 kHz. However, as given by Table 7, a subcarrier spacing $\Delta f_{RA}$ for a random access preamble is 1.25 kHz or 0.75 kHz.

As more communication devices have demanded higher communication capacity, there has been necessity of enhanced mobile broadband relative to legacy radio access technology (RAT). In addition, massive machine type communication for providing various services irrespective of time and place by connecting a plurality of devices and objects to each other is one main issue to be considered in future-generation communication. Further, a communication system design in which services/UEs sensitive to reliability and latency are considered is under discussion. The introduction of future-generation RAT has been discussed by taking into consideration enhanced mobile broadband communication, massive MTC, ultra-reliable and low-latency communication (URLLC), and the like. In current 3GPP, a study of the future-generation mobile communication system after EPC is being conducted. In the present invention, the corresponding technology is referred to as a new RAT (NR) or 5G RAT, for convenience.

An NR communication system demands that much better performance than a legacy fourth generation (4G) system be supported in terms of data rate, capacity, latency, energy consumption, and cost. Accordingly, the NR system needs to make progress in terms of bandwidth, spectrum, energy, signaling efficiency, and cost per bit.

<OFDM Numerology>

The new RAT system uses an OFDM transmission scheme or a similar transmission scheme. The new RAT system may follow the OFDM parameters different from OFDM parameters of the LTE system. Alternatively, the new RAT system may conform to numerology of the legacy LTE/LTE-A system but may have a broader system bandwidth (e.g., 100 MHz) than the legacy LTE/LTE-A system. One cell may support a plurality of numerologies. That is, UEs that operate with different numerologies may coexist within one cell.

<Subframe Structure>

In the 3GPP LTE/LTE-A system, radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s = 1/(2048 \cdot 15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like. The TTI refers to an interval during which data can be scheduled. For example, in a current LTE/LTE-A system, a transmission opportunity of a UL grant or a DL grant is present every 1 ms and several transmission opportunities of the UL/DL grant are not present within a shorter time than 1 ms. Therefore, the TTI in the legacy LTE/LTE-A system is 1 ms.

Figure 2:
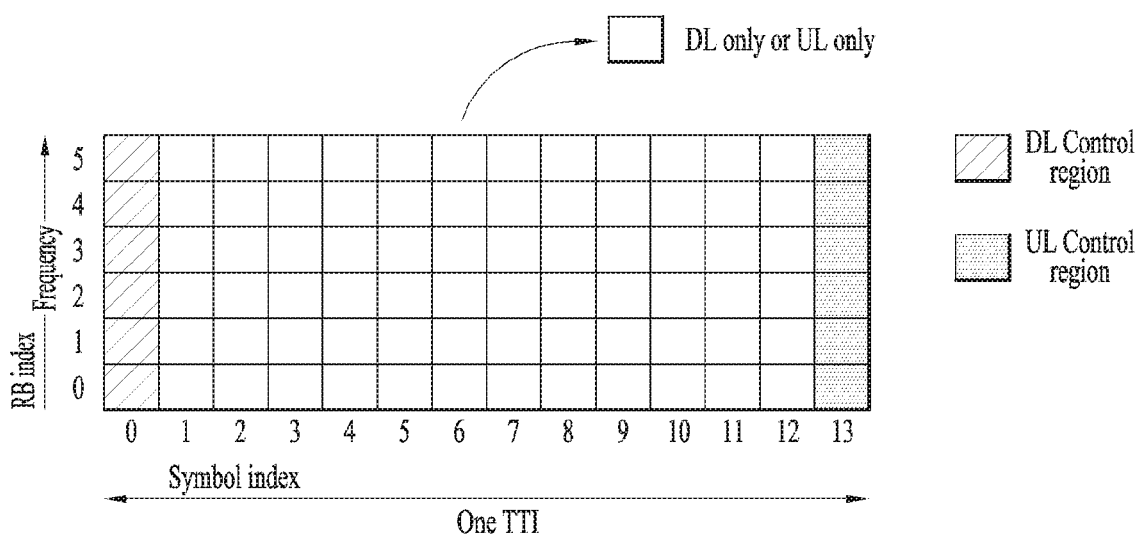
FIG. 2 illustrates a slot structure available in a new radio access technology (NR).

FIG. 2 illustrates a slot structure available in a new radio access technology (NR).

To minimize data transmission latency, in a 5G new RAT, a slot structure in which a control channel and a data channel are time-division-multiplexed is considered.

In FIG. 2, the hatched area represents the transmission region of a DL control channel (e.g., PDCCH) carrying the DCI, and the black area represents the transmission region of a UL control channel (e.g., PUCCH) carrying the UCI. Here, the DCI is control information that the gNB transmits to the UE. The DCI may include information on cell configuration that the UE should know, DL specific information such as DL scheduling, and UL specific information such as UL grant. The UCI is control information that the UE transmits to the gNB. The UCI may include a HARQ ACK/NACK report on the DL data, a CSI report on the DL channel status, and a scheduling request (SR).

In FIG. 2, the region of symbols from symbol index 1 to symbol index 12 may be used for transmission of a physical channel (e.g., a PDSCH) carrying downlink data, or may be used for transmission of a physical channel (e.g., PUSCH) carrying uplink data. According to the slot structure of FIG. 2, DL transmission and UL transmission may be sequentially performed in one slot, and thus transmission/reception of DL data and reception/transmission of UL ACK/NACK for the DL data may be performed in one slot. As a result, the time taken to retransmit data when a data transmission error occurs may be reduced, thereby minimizing the latency of final data transmission.

In such a slot structure, a time gap is needed for the process of switching from the transmission mode to the reception mode or from the reception mode to the transmission mode of the gNB and UE. On behalf of the process of switching between the transmission mode and the reception mode, some OFDM symbols at the time of switching from DL to UL in the slot structure are set as a guard period (GP).

In the legacy LTE/LTE-A system, a DL control channel is time-division-multiplexed with a data channel and a PDCCH, which is a control channel, is transmitted throughout an entire system band. However, in the new RAT, it is expected that a bandwidth of one system reaches approximately a minimum of 100 MHz and it is difficult to distribute the control channel throughout the entire band for transmission of the control channel. For data transmission/reception of a UE, if the entire band is monitored to receive the DL control channel, this may cause increase in battery consumption of the UE and deterioration in efficiency. Accordingly, in the present invention, the DL control channel may be locally transmitted or distributively transmitted in a partial frequency band in a system band, i.e., a channel band.

In the NR system, the basic transmission unit is a slot. A duration of the slot includes 14 symbols having a normal cyclic prefix (CP) or 12 symbols having an extended CP. In addition, the slot is scaled in time as a function of a used subcarrier spacing.

<Analog Beamforming>

A recently discussed fifth generation (5G) mobile communication system is considering using an ultrahigh frequency band, i.e., a millimeter frequency band equal to or higher than 6 GHz, to transmit data to a plurality of users in a wide frequency band while maintaining a high transmission rate. In 3GPP, this system is used as NR and, in the present invention, this system will be referred to as an NR system. Since the millimeter frequency band uses too high a frequency band, a frequency characteristic thereof exhibits very sharp signal attenuation depending on distance. Therefore, in order to correct a sharp propagation attenuation characteristic, the NR system using a band of at least above 6 GHz uses a narrow beam transmission scheme to solve a coverage decrease problem caused by sharp propagation attenuation by transmitting signals in a specific direction so as to focus energy rather than in all directions. However, if a signal transmission service is provided using only one narrow beam, since a range serviced by one BS becomes narrow, the BS provides a broadband service by gathering a plurality of narrow beams.

In the millimeter frequency band, i.e., millimeter wave (mmW) band, the wavelength is shortened, and thus a plurality of antenna elements may be installed in the same area. For example, a total of 100 antenna elements may be installed in a 5-by-5 cm panel in a 30 GHz band with a wavelength of about 1 cm in a 2-dimensional array at intervals of $0.5\lambda$ (wavelength). Therefore, in mmW, increasing the coverage or the throughput by increasing the beamforming (BF) gain using multiple antenna elements is taken into consideration.

As a method of forming a narrow beam in the millimeter frequency band, a beamforming scheme is mainly considered in which the BS or the UE transmits the same signal using a proper phase difference through a large number of antennas so that energy increases only in a specific direction. Such a beamforming scheme includes digital beamforming for imparting a phase difference to a digital baseband signal, analog beamforming for imparting a phase difference to a modulated analog signal using time latency (i.e., cyclic shift), and hybrid beamforming using both digital beamforming and analog beamforming. If a transceiver unit (TXRU) is provided for each antenna element to enable adjustment of transmit power and phase, independent beamforming is possible for each frequency resource. However, installing TXRU in all of the about 100 antenna elements is less feasible in terms of cost. That is, the millimeter frequency band needs to use numerous antennas to correct the sharp propagation attenuation characteristic. Digital beamforming requires as many radio frequency (RF) components (e.g., a digital-to-analog converter (DAC), a mixer, a power amplifier, a linear amplifier, etc.) as the number of antennas. Therefore, if digital beamforming is desired to be implemented in the millimeter frequency band, cost of communication devices increases. Hence, when a large number of antennas is needed as in the millimeter frequency band, use of analog beamforming or hybrid beamforming is considered. In the analog beamforming method, multiple antenna elements are mapped to one TXRU and a beam direction is adjusted using an analog phase shifter. This analog beamforming method may only make one beam direction in the whole band, and thus may not perform frequency selective beamforming (BF), which is disadvantageous. The hybrid BF method is an intermediate type of digital BF and analog BF and uses B TXRUs less in number than Q antenna elements. In the case of hybrid BF, the number of directions in which beams may be transmitted at the same time is limited to B or less, which depends on the method of collection of B TXRUs and Q antenna elements.

As mentioned above, digital BF may simultaneously transmit or receive signals in multiple directions using multiple beams by processing a digital baseband signal to be transmitted or received, whereas analog BF cannot simultaneously transmit or receive signals in multiple directions exceeding a coverage range of one beam by performing BF in a state in which an analog signal to be transmitted or received is modulated. Typically, the BS simultaneously performs communication with a plurality of users using broadband transmission or multi-antenna characteristics. If the BS uses analog or hybrid BF and forms an analog beam in one beam direction, the eNB communicates with only users included in the same analog beam direction due to an analog BF characteristic. An RACH resource allocation method and a resource use method of the BS according to the present invention, which will be described later, are proposed considering restrictions caused by the analog BF or hybrid BF characteristic.

<Hybrid Analog BF>

Figure 3:
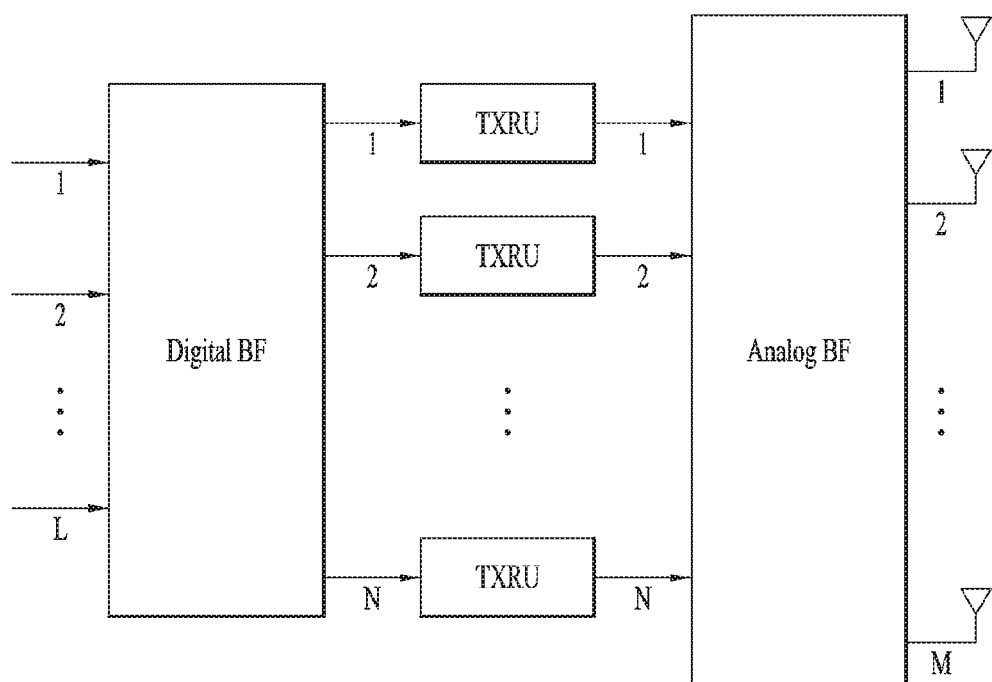
FIG. 3 abstractly illustrates transceiver units (TXRUs) and a hybrid beamforming structure in terms of physical antennas.

FIG. 3 abstractly illustrates TXRUs and a hybrid BF structure in terms of physical antennas.

When a plurality of antennas is used, a hybrid BF method in which digital BF and analog BF are combined is considered. Analog BF (or RF BF) refers to an operation in which an RF unit performs precoding (or combining). In hybrid BF, each of a baseband unit and the RF unit performs precoding (or combining) so that performance approximating to digital BF can be obtained while the number of RF chains and the number of digital-to-analog (D/A) (or analog-to-digital (A/D)) converters is reduced. For convenience, the hybrid BF structure may be expressed as N TXRUs and M physical antennas. Digital BF for L data layers to be transmitted by a transmitter may be expressed as an N-by-L matrix. Next, N converted digital signals are converted into analog signals through the TXRUs and analog BF expressed as an M-by-N matrix is applied to the analog signals. In FIG. 3, the number of digital beams is L and the number of analog beams is N. In the NR system, the BS is designed so as to change analog BF in units of symbols and efficient BF support for a UE located in a specific region is considered. If the N TXRUs and the M RF antennas are defined as one antenna panel, the NR system considers even a method of introducing plural antenna panels to which independent hybrid BF is applicable. In this way, when the BS uses a plurality of analog beams, since which analog beam is favorable for signal reception may differ according to each UE, a beam sweeping operation is considered so that, for at least a synchronization signal, system information, and paging, all UEs may have reception opportunities by changing a plurality of analog beams, that the BS is to apply, according to symbols in a specific slot or subframe.

Recently, a 3GPP standardization organization is considering network slicing to achieve a plurality of logical networks in a single physical network in a new RAT system, i.e., the NR system, which is a 5G wireless communication system. The logical networks should be capable of supporting various services (e.g., eMBB, mMTC, URLLC, etc.) having various requirements. A physical layer system of the NR system considers a method supporting an orthogonal frequency division multiplexing (OFDM) scheme using variable numerologies according to various services. In other words, the NR system may consider the OFDM scheme (or multiple access scheme) using independent numerologies in respective time and frequency resource regions.

Recently, as data traffic remarkably increases with appearance of smartphone devices, the NR system needs to support of higher communication capacity (e.g., data throughput). One method considered to raise the communication capacity is to transmit data using a plurality of transmission (or reception) antennas. If digital BF is desired to be applied to the multiple antennas, each antenna requires an RF chain (e.g., a chain consisting of RF elements such as a power amplifier and a down converter) and a D/A or A/D converter. This structure increases hardware complexity and consumes high power which may not be practical. Accordingly, when multiple antennas are used, the NR system considers the above-mentioned hybrid BF method in which digital BF and analog BF are combined.

Figure 4:
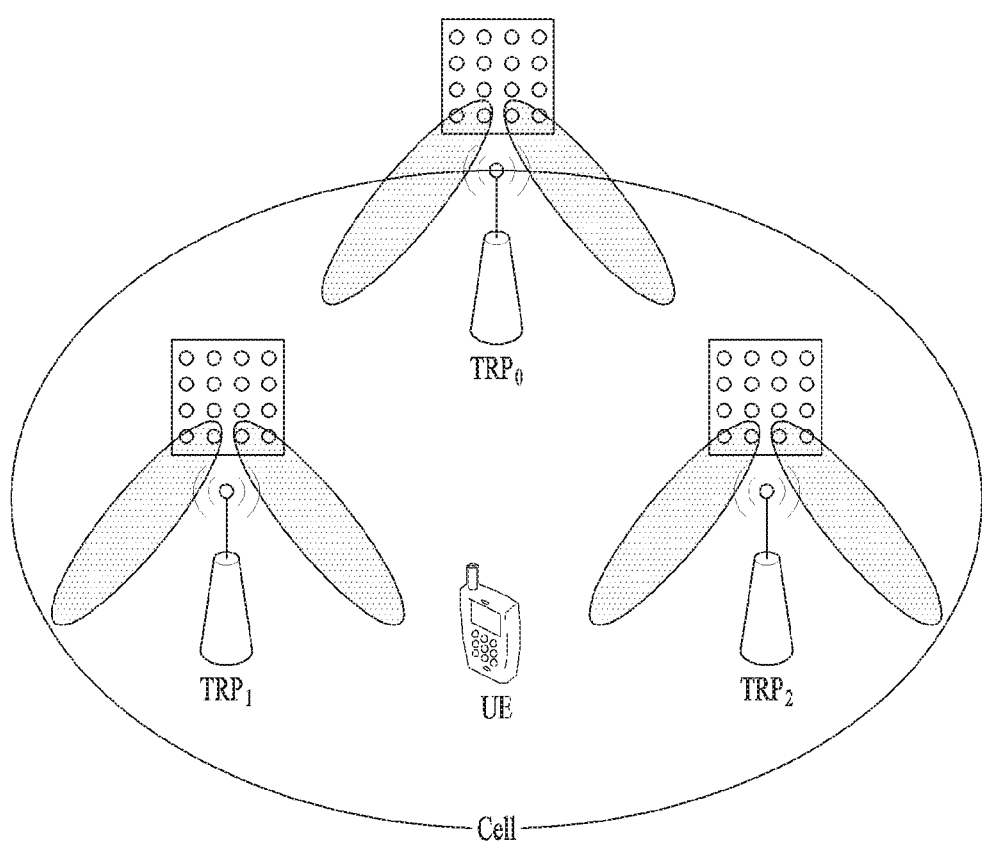
FIG. 4 illustrates a cell of a new radio access technology (NR) system.

FIG. 4 illustrates a cell of a new radio access technology (NR) system.

Referring to FIG. 4, in the NR system, a method in which a plurality of transmission and reception points (TRPs) form one cell is being discussed unlike a wireless communication system of legacy LTE in which one BS forms one cell. If the plural TRPs form one cell, seamless communication can be provided even when a TRP that provides a service to a UE is changed so that mobility management of the UE is facilitated.

In an LTE/LTE-A system, a PSS/SSS is transmitted omni-directionally. Meanwhile, a method is considered in which a gNB which uses millimeter wave (mmWave) transmits a signal such as a PSS/SSS/PBCH through BF while sweeping beam directions omni-directionally. Transmission/reception of a signal while sweeping beam directions is referred to as beam sweeping or beam scanning. In the present invention, "beam sweeping" represents a behavior of a transmitter and "beam scanning" represents a behavior of a receiver. For example, assuming that the gNB may have a maximum of N beam directions, the gNB transmits a signal such as a PSS/SSS/PBCH in each of the N beam directions. That is, the gNB transmits a synchronization signal such as the PSS/SSS/PBCH in each direction while sweeping directions that the gNB can have or the gNB desires to support. Alternatively, when the gNB can form N beams, one beam group may be configured by grouping a few beams and the PSS/SSS/PBCH may be transmitted/received with respect to each beam group. In this case, one beam group includes one or more beams. The signal such as the PSS/SSS/PBCH transmitted in the same direction may be defined as one synchronization (SS) block and a plurality of SS blocks may be present in one cell. When the plural SS blocks are present, SS block indexes may be used to distinguish between the SS blocks. For example, if the PSS/SSS/PBCH is transmitted in 10 beam directions in one system, the PSS/SSS/PBCH transmitted in the same direction may constitute one SS block and it may be understood that 10 SS blocks are present in the system. In the present invention, a beam index may be interpreted as an SS block index.

Figure 5:
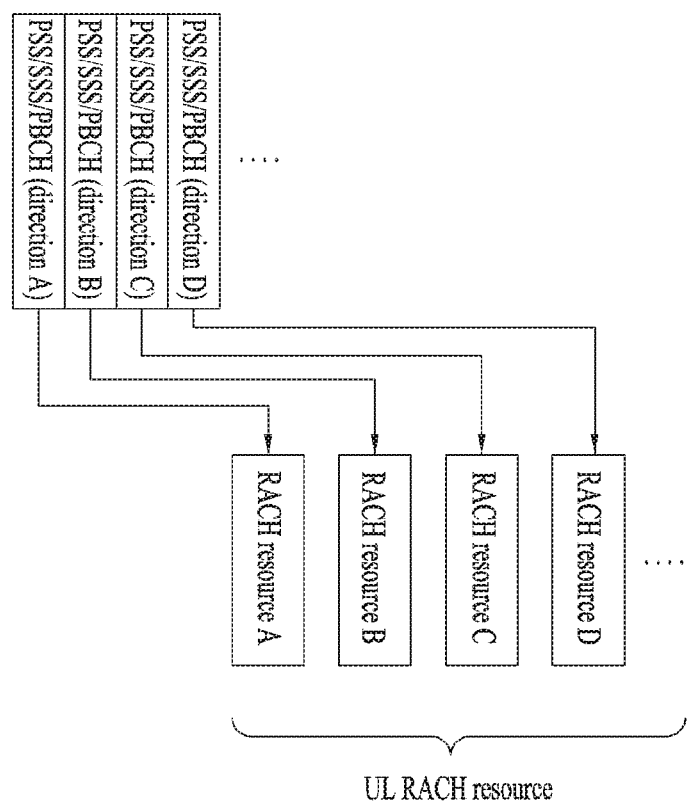
FIG. 5 illustrates transmission of a synchronization signal (SS) block and an RACH resource linked to the SS block.

FIG. 5 illustrates transmission of an SS block and an RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present invention, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs an RACH procedure in order to inform the gNB that the UE will access the gNB that the UE has discovered. 4) The gNB connects or associates the SS block transmitted per beam and an RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using an RACH resource connected to an optimal beam direction that the UE has discovered, the gNB obtains information about a DL beam suitable for the UE in a procedure of receiving an RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, an RACH signal used for initial access to the gNB, i.e., initial access to the gNB through a cell used by the gNB, may be configured using the following elements.

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in an RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause an RACH signal arriving at the gNB with delay from the farthest distance from the gNB on RACH coverage not to create interference with respect to a signal arriving after an RACH symbol duration. During this GT, the UE does not transmit a signal so that the GT may not be defined as the RACH signal.

Figure 6:
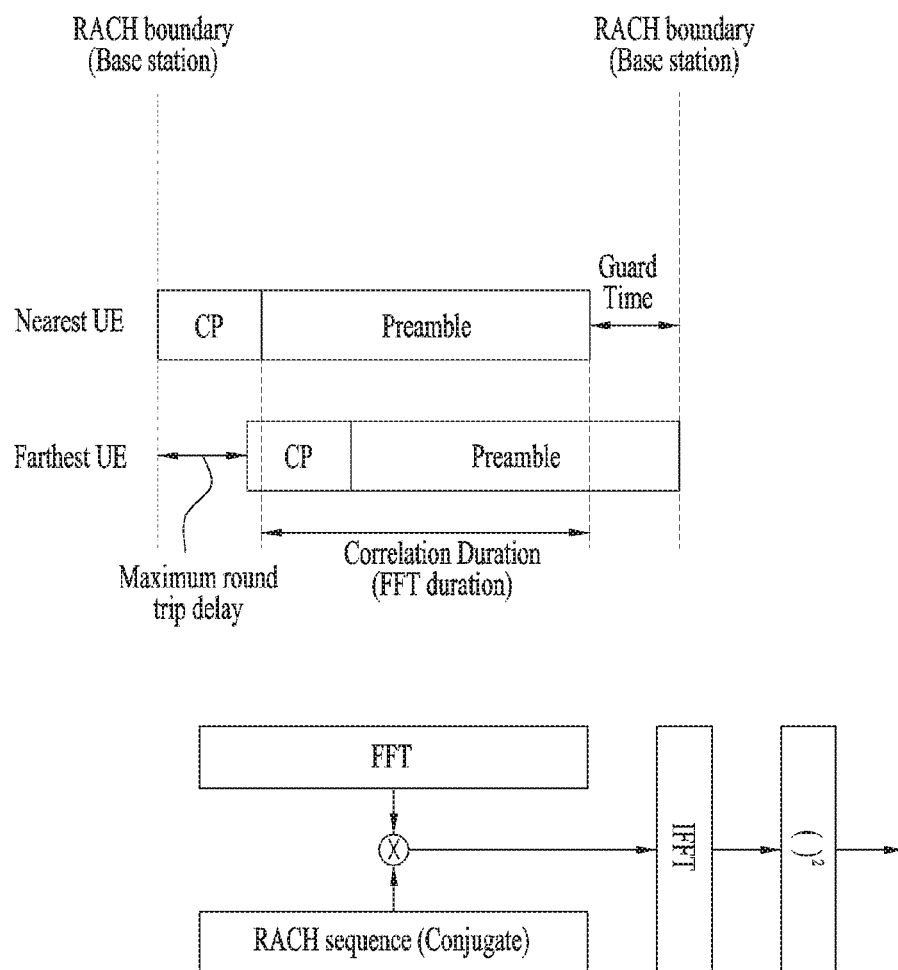
FIG. 6 illustrates configuration/format of a random access channel (RACH) preamble and a receiver function.

FIG. 6 illustrates configuration/format of an RACH preamble and a receiver function.

The UE transmits an RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and an RACH procedure so that the gNB may properly detect the RACH preamble. The present invention proposes the RACH preamble and/or the RACH procedure for a high frequency band to which the NR system, especially, BF, is applicable in consideration of the case in which BC of the gNB holds and the case in which BC does not hold.

Figure 7:
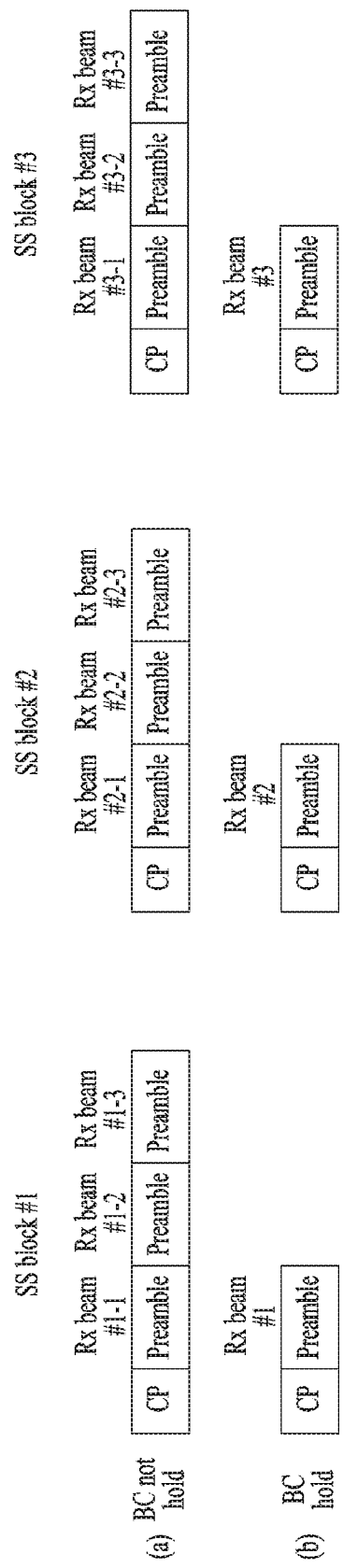
FIG. 7 illustrates a reception (Rx) beam formed at a gNB to receive an RACH preamble.

FIG. 7 illustrates a reception (Rx) beam formed at a gNB to receive an RACH preamble.

If BC does not hold, beam directions may be mismatched even when the gNB forms an Rx beam in a Tx beam direction of an SS block in a state in which an RACH resource is linked to the SS block. Therefore, an RACH preamble may be configured in a format illustrated in FIG. 7(a) so that the gNB may perform beam scanning for performing/attempting to perform RACH preamble detection in multiple directions while sweeping Rx beams. Meanwhile, if BC holds, since the RACH resource is linked to the SS block, the gNB may form an Rx beam in a direction used to transmit the SS block with respect to one RACH resource and detect the RACH preamble only in that direction. Therefore, the RACH preamble may be configured in a format illustrated in FIG. 7(b).

As described previously, an RACH signal and an RACH resource should be configured in consideration of two purposes of a DL beam acquisition report and a DL preferred beam report of the UE and beam scanning of the gNB according to BC.

Figure 8:
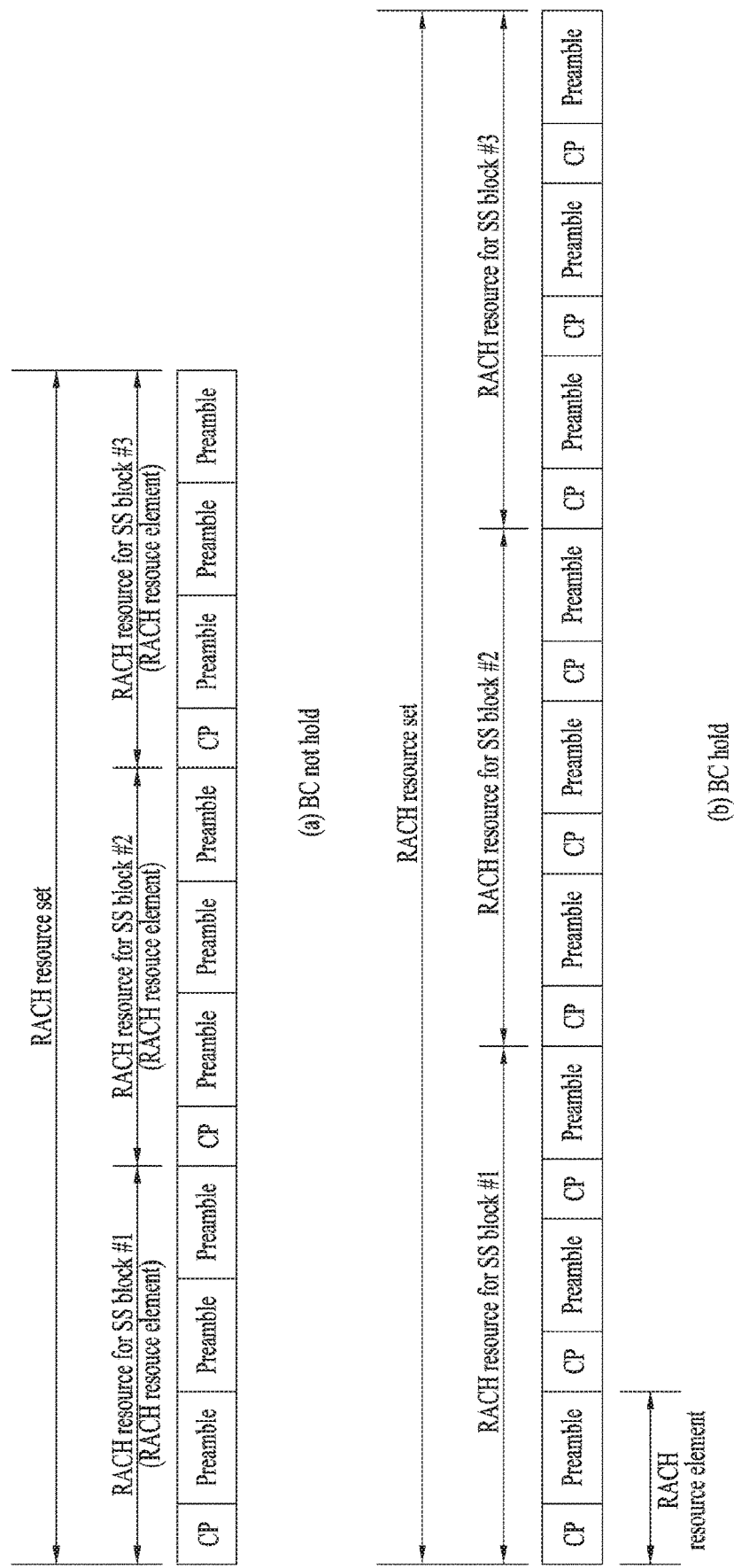
FIG. 8 illustrates an RACH signal and an RACH resource to explain terms used to describe the present invention.

FIG. 8 illustrates an RACH signal and an RACH resource to explain terms used to describe the present invention. In the present invention, the RACH signal may be configured as follows.

RACH resource element: The RACH resource element is a basic unit used when the UE transmits the RACH signal. Since different RACH resource elements may be used for RACH signal transmission by different UEs, respectively, a CP is inserted into the RACH signal in each RACH resource element. Protection for signals between UEs is already maintained by the CP and, therefore, a GT is not needed between RACH resource elements.

RACH resource: The RACH resource is defined as a set of concatenated RACH resource elements connected to one SS block. If RACH resources are consecutively allocated contiguously, two successive RACH resources may be used for signal transmission by different UEs, respectively, like the RACH resource elements. Therefore, the CP may be inserted into the RACH signal in each RACH resource. The GT is unnecessary between RACH resources because signal detection distortion caused by time delay is prevented by the CP. However, if only one RACH resource is configured, i.e., RACH resources are not consecutively configured, since a PUSCH/PUCCH may be allocated after the RACH resource, the GT may be inserted in front of the PUSCH/PUCCH.

RACH resource set: The RACH resource set is a set of concatenated RACH resources. If multiple SS blocks are present in a cell and RACH resources connected respectively to the multiple SS blocks are concatenated, the concatenated RACH resources may be defined as one RACH resource set. The GT is inserted into the last of the RACH resource set which is a part where the RACH resource set including RACH resources and another signal such as a PUSCH/PUCCH may be encountered. As mentioned above, since the GT is a duration during which a signal is not transmitted, the GT may not be defined as a signal. The GT is not illustrated in FIG. 8.

RACH preamble repetition: When an RACH preamble for Rx beam scanning of the gNB is configured, i.e., when the gNB configures an RACH preamble format so that the gNB may perform Rx beam scanning, if the same signal (i.e., same sequence) is repeated within the RACH preamble, the CP is not needed between the repeated signals because the repeated signals serve as the CP. However, when preambles are repeated within the RACH preamble using different signals, the CP is needed between the preambles. The GT is not needed between RACH preambles. Hereinafter, the present invention is described under the assumption that the same signal is repeated. For example, if the RACH preamble is configured in the form of 'CP+preamble+preamble', the present invention is described under the assumption that the preambles within the RACH preamble are configured by the same sequence.

FIG. 8 illustrates RACH resources for a plurality of SS blocks and RACH preambles in each RACH resource in terms of the gNB. The gNB attempts to receive an RACH preamble in each RACH resource in a time region in which the RACH resources are configured. The UE transmits an RACH preamble thereof through RACH resource(s) linked to specific SS block(s) (e.g., SS block(s) having better Rx quality) rather than transmitting the RACH preamble in each of RACH resources for all SS blocks of the cell. As mentioned above, different RACH resource elements or different RACH resources may be used to transmit RACH preambles by different UEs.

Figure 9:
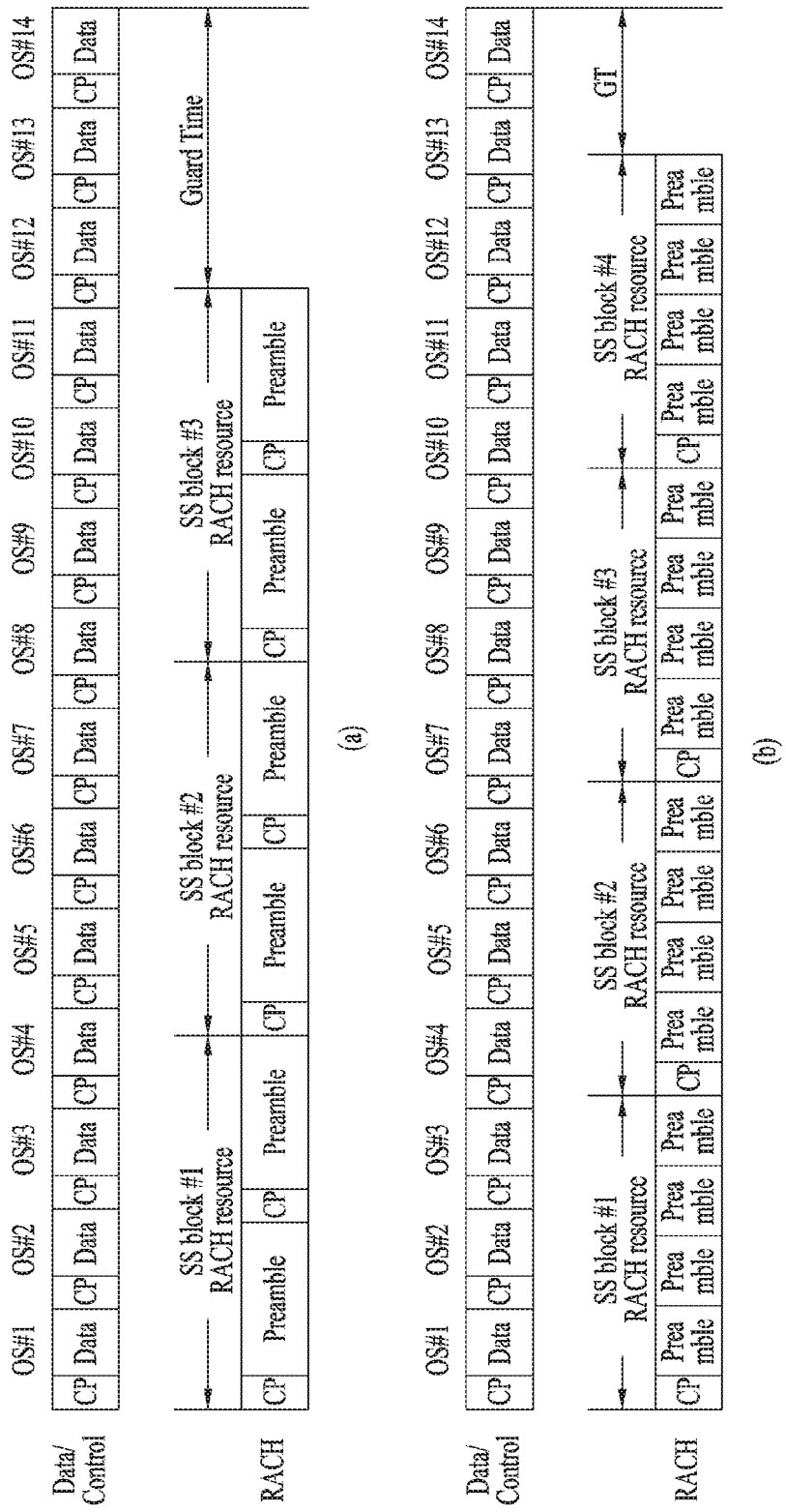
FIG. 9 illustrates an RACH resource set.

FIG. 9 illustrates a RACH resource set. FIG. 9(*a*) illustrates the case in which two RACH resource elements per RACH resource are configured in a cell of the gNB in which BC holds. FIG. 9(*b*) illustrates the case in which one RACH resource element per RACH resource is configured in the cell of the gNB in which BC does hold. Referring to FIG. 9(*a*), two RACH preambles may be transmitted in an RACH resource linked to an SS block. Referring to FIG. 9(*b*), one RACH preamble may be transmitted in an RACH resource linked to an SS block.

An RACH resource set may be configured as illustrated in FIG. 9 so as to maximize the efficiency of an RACH resource using the RACH signal configuration characteristic described in FIG. 8. As illustrated in FIG. 9, in order to raise use/allocation efficiency of the RACH resource, RACH resources or RACH resource elements may be configured to be completely concatenated without allocating a blank duration between RACH resources in the RACH resource set.

However, if RACH resources are configured as illustrated in FIG. 9, the following problems may arise. 1) When BC holds and the gNB receives an RACH resource corresponding to SS block # N by forming a beam in the direction of SS block # N, since an Rx beam is changed at a middle of OFDM symbols (OSs) defined for a data or control channel, the gNB only partially uses resources other than a frequency resource allocated as the RACH resource. That is, as illustrated in FIG. 9(*a*), if the gNB forms an Rx beam to receive SS block #1, OS #4 cannot be used for the data channel or the control channel. 2) When BC does not hold and the gNB performs Rx beam scanning within an RACH resource element, the gNB may perform RACH preamble detection while receiving a data/control signal by forming an Rx beam on each of OSs at a boundary of OS #1/OS #2/OS #3 with respect to an RACH resource corresponding to SS block #1. However, when the gNB performs beam scanning for an RACH resource corresponding to SS block #2, a beam direction for receiving the data/control signal and a beam direction for receiving an RACH preamble are not matched in a duration corresponding to OS #4 so that a problem occurs in detecting the RACH preamble.

In summary, if the gNB performs beam scanning while changing the direction of an Rx beam for RACH signal reception and a timing at which the Rx beam is changed mismatches an OFDM symbol boundary defined for the data or control channel, there is a problem of lowering resource use/allocation efficiency of the data or control channel serviced in a frequency region other than a frequency resource allocated as the RACH resource. To solve this problem, the present invention proposes allocating an RACH resource as a structure aligned with an OFDM symbol boundary, in order for the gNB to perform RACH preamble detection while changing a beam direction in a multi-beam scenario and simultaneously for the gNB to use all radio resources other than the RACH resource for the data and control channels. When BC holds, by way of example, an RACH resource or an RACH preamble transmitted through the RACH resource may be aligned with an OFDM symbol boundary using two methods as illustrated in FIG. 10.

Figure 10:
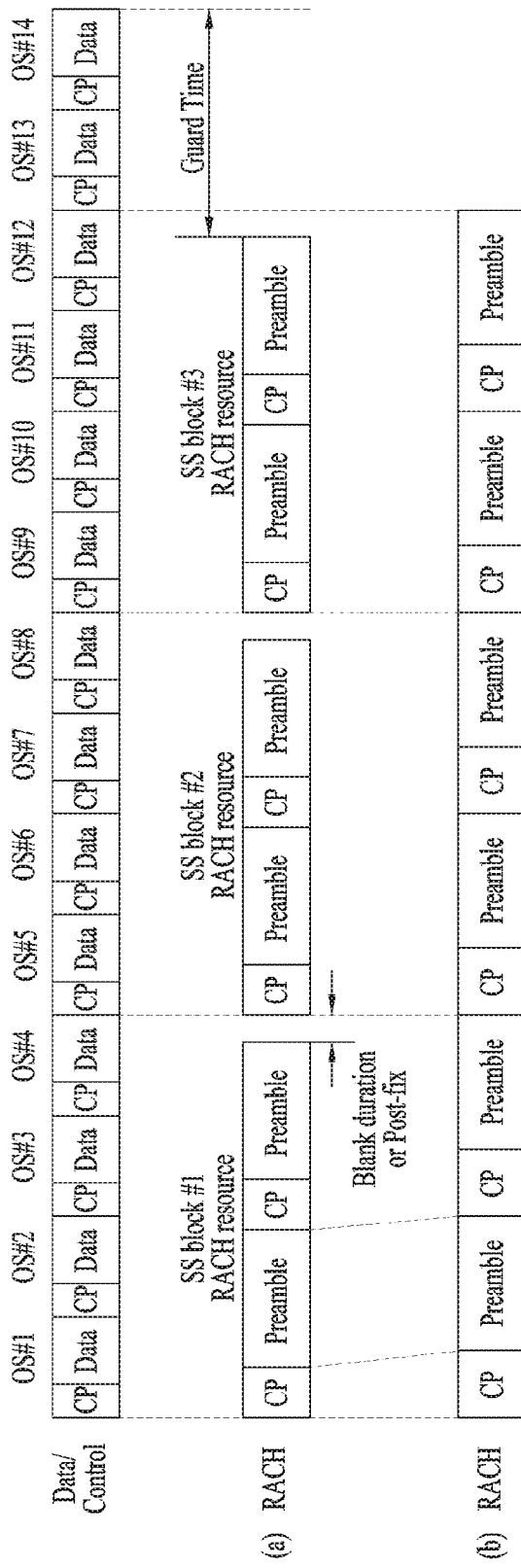
FIG. 10 illustrates boundary alignment of an RACH resource according to the present invention.

FIG. 10 illustrates boundary alignment of an RACH resource according to the present invention. An example illustrated in FIG. 10 corresponds to the case in which BS holds and two RACH resource elements can be transmitted on one RACH resource. When BC does not hold, one RACH preamble may be configured by one CP and a plurality of consecutive preambles as illustrated in FIG. 7(a) or FIG. 8(a). Even in this case, the present invention is applicable. Only one RACH resource element may be transmitted on one RACH resource and the present invention is applicable thereto.

1) One (hereinafter, Method 1) of methods for aligning an OFDM symbol boundary and an RACH resource boundary determines a CP length and a preamble length of an RACH preamble by taking into consideration RACH preamble detection capability by the gNB, coverage of the gNB, and a subcarrier spacing of the RACH preamble and then configure an RACH resource element using the CP length and the preamble length, as illustrated in FIG. 10(a). The gNB may configure the RACH resource by determining the number of RACH resource elements per RACH resource in consideration of the capacity of the RACH resource. The gNB configures RACH resource(s) such that a boundary of each of RACH resources which are to be consecutively used is aligned with a boundary of OFDM symbol(s) which are to be used for the data and control channels. In this case, a blank duration may occur between RACH resources. The blank duration may be configured as a duration during which no signals are transmitted. Alternatively, a signal may be additionally transmitted as a post-fix only to the last RACH resource element in the RACH resource. That is, the UE that transmits an RACH preamble using the last RACH resource element in the time domain among RACH resource elements in an RACH resource may add a post-fix signal to the RACH preamble thereof and then transmit the RACH preamble. The UE that transmits an RACH preamble using an RACH resource element other than the last RACH resource element may transmit the RACH preamble without adding the post-fix signal.

2) Another method (hereinafter, Method 2) among the methods of aligning the OFDM symbol boundary and the RACH resource boundary configures a CP length and a preamble length in order to align the RACH resource boundary with the OFDM symbol boundary as illustrated in FIG. 10(b). However, since the number of RACH resource elements in each RACH resource may vary, if the length of the RACH preamble is changed to match the OFDM symbol boundary, there is a danger of changing characteristics of a preamble sequence in the RACH preamble. That is, the length of a Zadoff-Chu (ZC) sequence used to generate a preamble is determined as 839 or 130 according to a preamble format as illustrated in Table 4. If the length of the preamble is changed in order to align the length of the RACH preamble with the OFDM symbol boundary, the characteristics of the ZC sequence which is the preamble sequence may vary. Therefore, if an RACH preamble format is determined and RACH resource elements per RACH resource are determined, the length of the RACH preamble may be fixed but a CP length may become greater than a length determined in configuring the RACH preamble format so that the RACH resource is aligned with the OFDM symbol boundary. That is, this method serves to align an RACH resource boundary, i.e., an RACH preamble boundary transmitted through the RACH resource with an OFDM symbol used to transmit the data/control channel (i.e., normal OFDM symbol) by fixing the length of each preamble in the RACH preamble and increasing the CP length to match the OFDM symbol boundary so as to maintain characteristics of the preamble sequence. In this case, only CP lengths of some RACH resource elements may be configured to be increased (i.e., only CP lengths of some RACH preambles are configured to be increased) or CP lengths of all RACH resource elements may be configured to be properly increased (i.e., a CP length of each RACH preamble is configured to be properly increased). For example, if the gNB configures the RACH resource in the time domain configured by OFDM symbols, the gNB configures a preamble format indicating a CP length and a sequence part length such that the sequence part length is a positive integer multiple of a preamble length obtained from a specific length (e.g., the length of a ZC sequence for an RACH) according to the number of preambles to be included in a corresponding RACH preamble and the CP length is equal to a value obtained by subtracting the sequence part length from a total length of the normal OFDM symbols. If the lengths of OFDM symbols are all the same, the RACH preamble format according to the present invention will be defined such that the sum of a positive integer multiple of a predefined preamble length (e.g., a preamble length obtained from a predefined length of a ZC sequence) and a CP length is a multiple of an OFDM symbol length. When the UE detects an SS block of a cell and generates an RACH preamble to be transmitted on an RACH resource connected to the SS block, the UE generates the RACH preamble by generating each preamble to be included in the RACH preamble using a sequence of a specific length (e.g., ZC sequence) according to a preamble format configured by the gNB and adding a CP to a front part of the preamble or repetition(s) of the preamble.

Method 1 and Method 2 may be equally applied even when the gNB performs Rx beam scanning because BC does not hold. When BC holds for Method 1 and Method 2, there is a high possibility that an RACH preamble is configured in a format including one preamble. Meanwhile, except that there is a high possibility that the RACH preamble is configured to include preamble repetition when BC does not hold, Method 1 and Method 2 described with reference to FIG. 10 may be equally applied to the case in which the gNB desires to perform Rx beam scanning because BS does not hold. For example, when BC does not hold so that the gNB desires to perform Rx beam scanning, the gNB configures and signals a preamble format (e.g., refer to FIG. 7(a) or FIG. 8(a)) in the form of including preamble repetition. Herein, the RACH resource may be configured in the form of Method 1 so as to monitor RACH preamble(s) by considering a duration from the end of one RACH resource to a part immediately before the start of the next RACH resource as a blank duration or a post-fix duration. Alternatively, the RACH resource may be configured in the form of Method 2 so as to monitor RACH preamble(s) in each RACH resource configured by the gNB under the assumption that the RACH preamble boundary is equal to the OFDM symbol boundary.

The RACH resource allocation method proposed in the present invention serves to efficiently use a frequency resource, other than a frequency resource occupied by the RACH resource, in one slot or multiple slots used for the RACH resource, as a data resource or a control channel resource. Therefore, for efficient use of the data/control channel resource considering the RACH resource, the gNB needs to schedule the data or control channel using information as to which unit is used to form a beam with respect to a slot to which the RACH resource is allocated. The UE may receive information as to which OFDM symbol unit is used when the gNB performs scheduling and transmit the data or control channel based on the information. To this end, two methods may be considered so that the gNB may schedule the data or control channel in a time region to which the RACH resource is allocated.

Mini Slot Allocation

When a channel is scheduled in a time region to which the RACH resource is allocated, since the scheduled channel should be included in one beam region, a time length of a resource to which the channel is allocated should be shorter than a time length of the RACH resource and a plurality of slots of a short length may be included for one RACH resource.

If the gNB operates by configuring a beam direction for each RACH resource and time units in which the gNB allocates a resource to the UE are not matched in a time region to which the RACH resource is allocated and in a time region to which the RACH resource is not allocated, the gNB should define a slot for scheduling in a time region occupied by the RACH resource and inform the UE of information related to the slot. Hereinafter, the slot used for scheduling in the time region occupied by the RACH resource will be referred to as a mini slot. In this structure, there are some considerations in order to transmit the data or control channel through the mini slot. For example, the following considerations are given.

Figure 11:
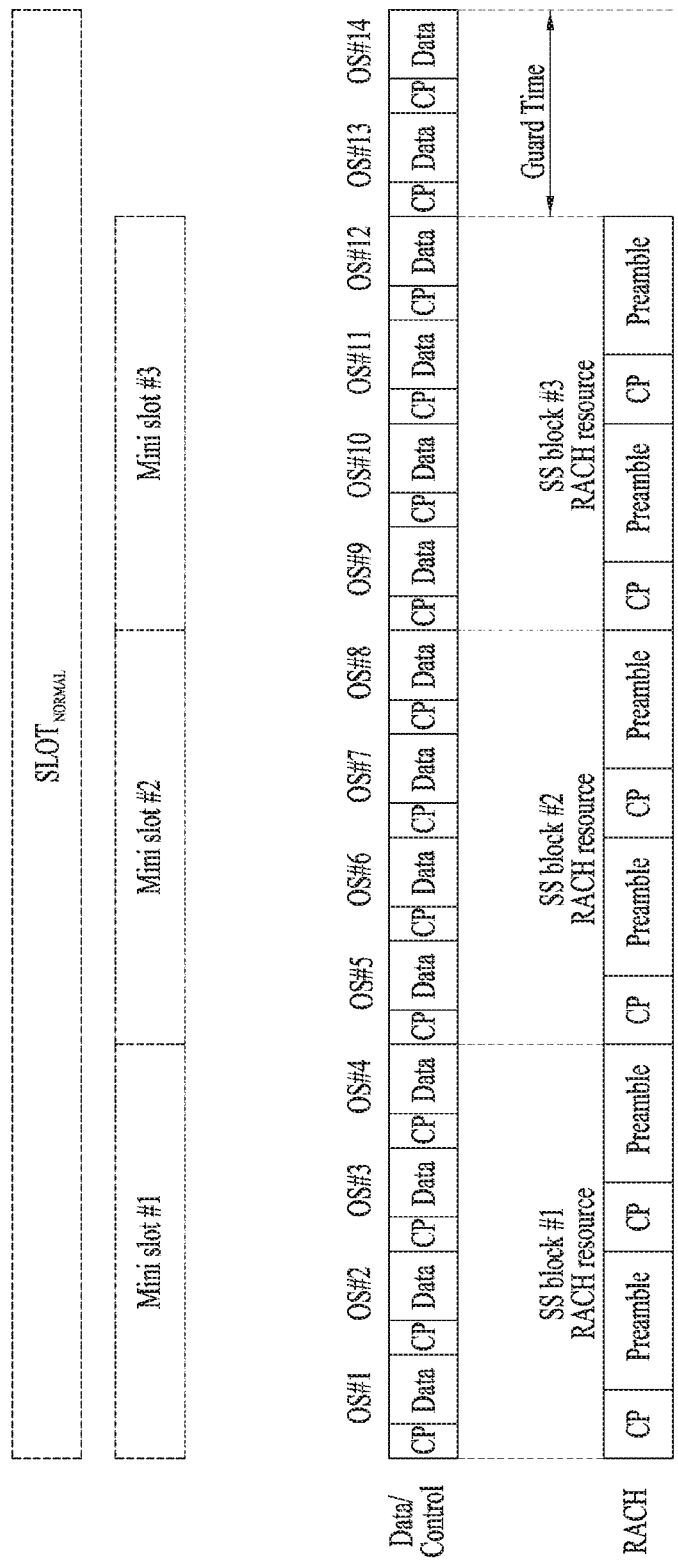
FIG. 11 illustrates a method of configuring a mini slot within an RACH slot $SLOT_{RACH}$ when BC holds.

1) The case in which one mini slot is defined for a slot to which the RACH resource is allocated:

FIG. 11 illustrates a method of configuring a mini slot within an RACH slot $SLOT_{RACH}$ when BC holds.

The UE is aware of all information about RACH resources that the gNB uses through system information. Therefore, a set of minimum OFDM symbols including a whole RACH resource allocated per SS block may be defined as one mini slot. When the gNB performs scheduling at a time to which the RACH resource is allocated, the UE interprets the mini slot as a TTI and transmits the data or control channel in the TTI. If multiple mini slots are included in one normal slot, the UE needs to determine through which mini slot the UE is to transmit the data/control channel. A method for the UE to determine a mini slot to be used to transmit the data/control channel may broadly include the following two schemes.

A. If the gNB schedules transmission of a UL data/control channel, the gNB may designate, for the UE, which mini slot within a slot the UE should use for transmission, through DCI.

B. The UE continuously performs beam tracking in a multi-beam scenario. If the UE previously receives, from the gNB, information about an SS block to which a serving beam from which the UE currently receives a service is connected, the UE interprets the same time region as a time region to which the RACH resource connected to the SS block associated with the serving beam is allocated as a time region in which the UE should perform transmission. If the RACH resource connected to the SS block associated with the serving beam of the UE is not present in a slot scheduled for the UE, the UE may determine that beam mismatch has occurred.

Figure 12:
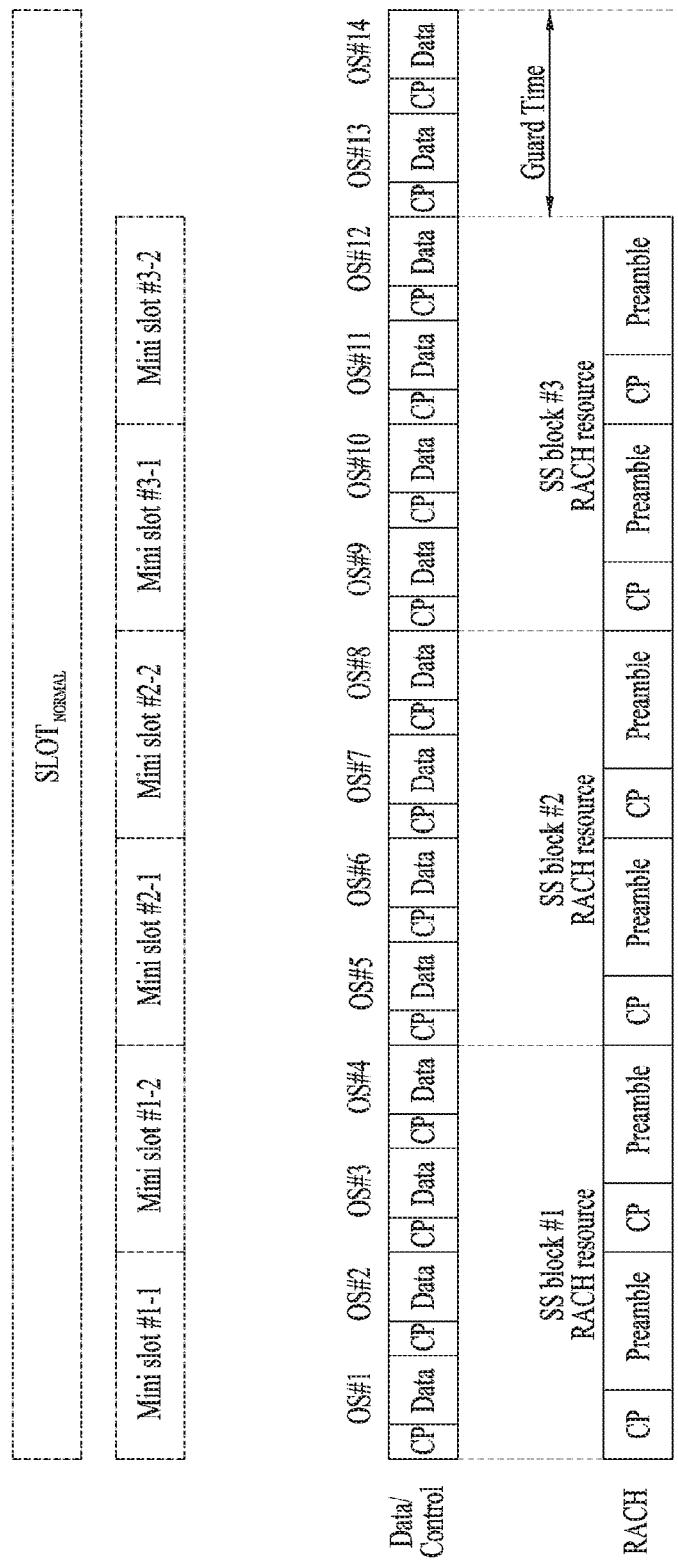
FIG. 12 illustrates another method of configuring a mini slot within an RACH slot $SLOT_{RACH}$ when BC holds.

2) The case in which multiple mini slots are defined in a slot to which the RACH resource is allocated:

FIG. 12 illustrates another method of configuring a mini slot within an RACH slot $SLOT_{RACH}$ when BC holds.

When multiple mini slots are defined in a slot to which a RACH resource is allocated, this is basically similar to the case in which multiple mini slots are defined in a slot to which a RACH resource is allocated except that multiple mini slots are present in a slot to which one RACH resource is allocated. The same operation as the method proposed in FIG. 11 is performed. However, as illustrated in FIG. 12, a set of minimum OFDM symbols including a whole RACH resource is divided into a few subsets and each subset is defined as a mini slot. In this case, the gNB should first inform the UE of how the set of minimum OFDM symbols including a RACH resource should be divided to use the mini slots. For example, the gNB may indicate, in a bitmap form, how the minimum OFDM symbols including the RACH resource are divided to the UE. Alternatively, when the minimum OFDM symbols including the RACH resource can be divided into a plurality of equal subsets, the gNB may inform the UE of the number of allocated mini slots. In addition, the gNB should indicate, to the scheduled UE, through which mini slot among the multiple mini slots the UE should transmit the data/control channel. The gNB may directly indicate a mini slot through which the data/control channel should be transmitted through the DCI. Alternatively, when the UE is scheduled in a time region to which the RACH resource is allocated, the gNB may inform the UE of a mini slot to be used, in advance (e.g., during connection setup). Alternatively, it is possible to determine a mini slot to be used by a predetermined rule using information, such as a UE ID, which is shared between the UE and the gNB.

Figure 13:
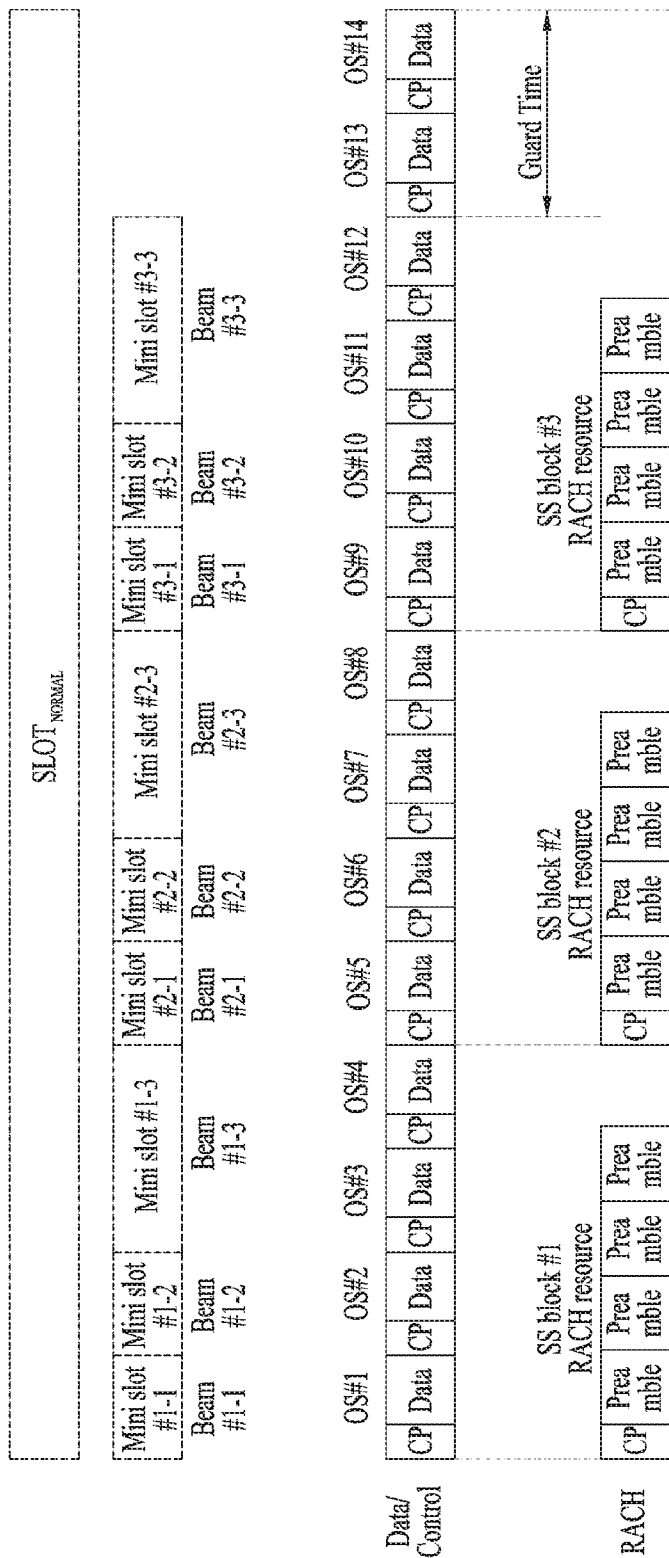
FIG. 13 illustrates a method of configuring a mini slot within an RACH slot $SLOT_{RACH}$ when beam correspondence (BC) does not hold.

3) The case in which BC does not hold and, thus, beam scanning is performed during preamble repetition:

FIG. 13 illustrates a method of configuring a mini slot within an RACH slot $SLOT_{RACH}$ when BC does not hold.

When BC does not hold, the gNB performs beam scanning while sweeping beam directions of a receiver in a slot to which one RACH resource is allocated, as described above. Therefore, this case may operate similarly to a scheme in which BC holds and multiple mini slots are present in a slot to which the RACH resource is allocated. To this end, similarly to the method described in FIG. 12, the gNB transmits, to the UE, information as to how beam scanning will be performed with respect to a set of minimum OFDM symbols including the RACH resource and information as to which SS block each beam is connected. This information may be used as information about which mini slot can be scheduled for the UE. In this case, similarly to the method described in FIG. 12, the UE may receive, through the DCI, the information about which mini slot among the multiple mini slots which can be scheduled for the UE is scheduled to transmit the data/control channel. Alternatively, the information may be prescheduled through an RRC signal or may be defined by a predefined rule using information shared between the gNB and the UE.

4) The case of grant-free scheduling:

A. When a time resource of a data/control channel transmitted by the UE on a grant-free resource overlaps an RACH resource, the data/control channel may be transmitted in a mini slot defined in a time region of the RACH resource. However, when grant-free scheduling is used and a signal format of the data/control channel that the UE is to transmit through the grant-free scheduling, i.e., through a grant-free resource, is a normal slot or a slot which is shorter than the normal slot but is longer than the mini slot defined in an RACH resource region and when the length of the mini slot is too short, so that a code rate of transmission of the data/control channel through the mini slot is too high relative to a designate code rate, the UE may i) drop transmission, ii) change a transport block size, or iii) transmit the data/control channel using multiple mini slots when the multiple mini slots are available. On the other hand, when the code rate of transmission of the data/control channel is lower than the designated code rate even if the data/control channel is transmitted with the length of the mini slot, the UE may transmit the data/control channel with a designated transport block size.

B. When grant-free scheduling is used and the signal format of the data/control channel that the UE is to transmit through the grant-free scheduling, i.e., through the grant-free resource, is shorter than the mini slot, the data/control channel may be normally transmitted at a mini slot location determined in the above-mentioned scheme. That is, if the data/control channel through grant-free scheduling requires a resource of a shorter length than the mini slot in the time domain, the UE transmits the data/control channel through a mini slot corresponding to the same gNB Rx beam as the data/control channel among mini slots configured to match the length of the RACH resource (i.e., RACH preamble). In this case, the transport block size may increase according to a predetermined rule in proportion to a mini slot length compared with a preconfigured signal format. For example, if the signal format in which the data/control channel is transmitted through grant-free scheduling is defined as using two OFDM symbols and the mini slot length in an RACH slot corresponds to three OFDM symbols, the transport block size capable of carrying the data/control channel of grant-free scheduling may increase by 1.5 times.

Figure 14:
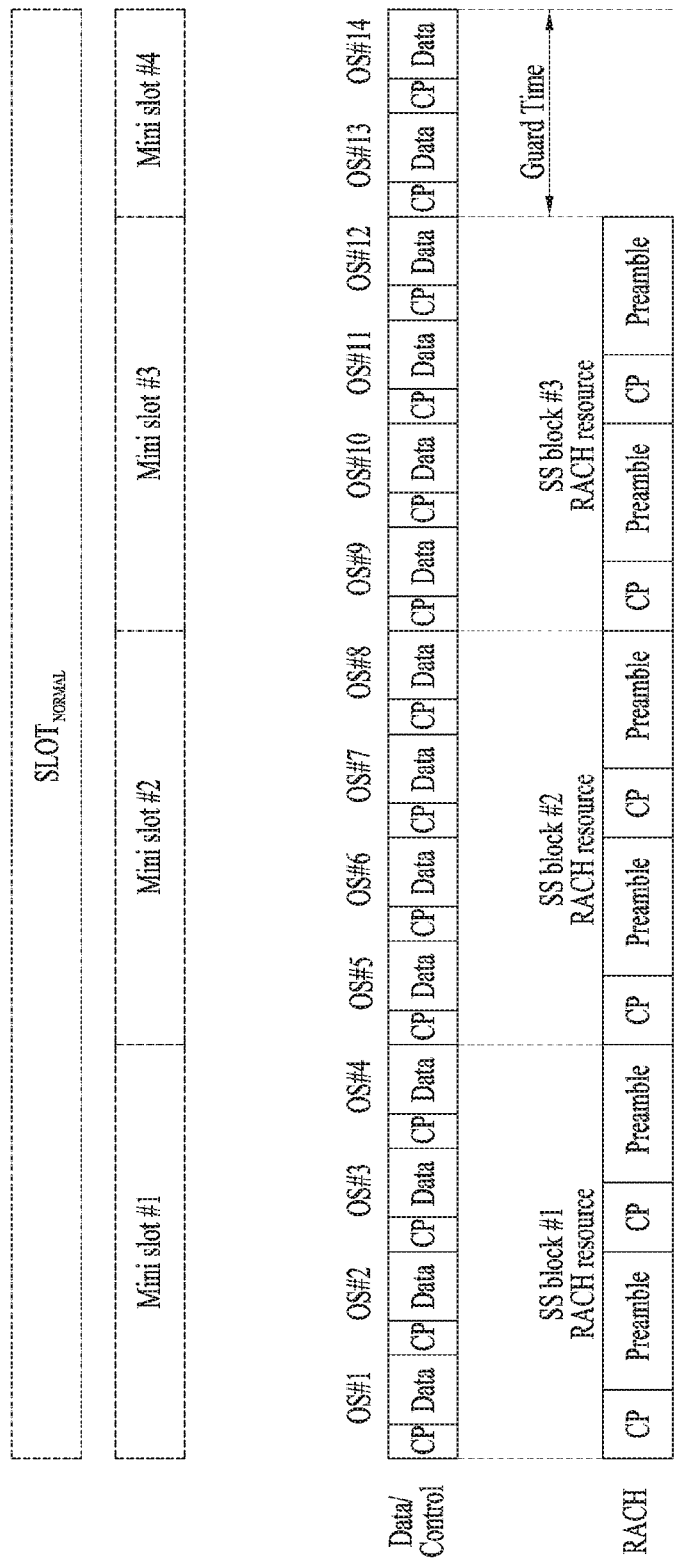
FIG. 14 illustrates a method of configuring a mini slot using a guard time.

5) Allocation of mini slot to guard time or blank duration:

FIG. 14 illustrates a method of configuring a mini slot using a guard time.

The gNB may freely configure an Rx beam with respect to a part of a duration configured as the guard time, or a blank duration in a slot remaining after configuring an RACH resource in one slot even though the blank duration is not for usage of the guard time. Accordingly, the gNB may inform the UE of information about a mini slot capable of being used independently of a beam for RACH resource reception together with information related to the RACH resource and the UE may expect that dynamic scheduling will be performed with respect to the mini slot configured in the guard time. The location(s) of allocated mini slot(s) may be determined by the above-described methods (e.g., methods of indicating the length and locations of mini slots configured in an RACH slot and a beam direction).

6) Allocation of short PUCCH resource:

In a TDD system, a control channel may be transmitted during a partial duration of one slot by configuring the control channel with a short length. In an NR system, schemes in which a DL control channel is transmitted in a front part of one slot and a UL control channel is transmitted in the last part of one slot are under discussion. Particularly, the UL control channel transmitted in this way is referred to as a short PUCHH. Since the short PUCCH is configured to be transmitted on the last one or two symbols, the short PUCCH may be transmitted in the above-described mini slot. However, as mentioned previously, since a beam direction may vary within one slot, the short PUCCH cannot always be located at the last part of the slot. Accordingly, when the short PUCCH is scheduled in a slot region to which an RACH resource is allocated, the UE transmits the short PUCCH in a mini slot in which a beam in the same direction as a beam from which the UE receives a service (i.e., a gNB Rx beam, or a UE Tx beam corresponding to the gNB Rx beam) or a beam in which the gNB previously forms a link for the short PUCCH (i.e., a gNB Rx beam, or a UE Tx beam corresponding to the gNB Rx beam) is present. In this case, the PUCCH may be transmitted at the last symbol location in the mini slot, a symbol location designated by the gNB through signaling, or a symbol location determined by a rule. However, the UE may drop transmission of the short PUCCH when the beam in the same direction as a beam from which the UE receives a service or the beam in which the gNB previously forms a link for the short PUCCH is not present.

Mini Slot Concatenation

In the procedure of forming the Rx beam for the RACH resource set, if Rx beam directions of respective RACH resources are not greatly different, the data or control channel may be transmitted through a long slot for performing transmission throughout a duration of the RACH resource set. This may be referred to as mini slot concatenation in which the above-described mini slots are used through concatenation as described above.

Figure 15:
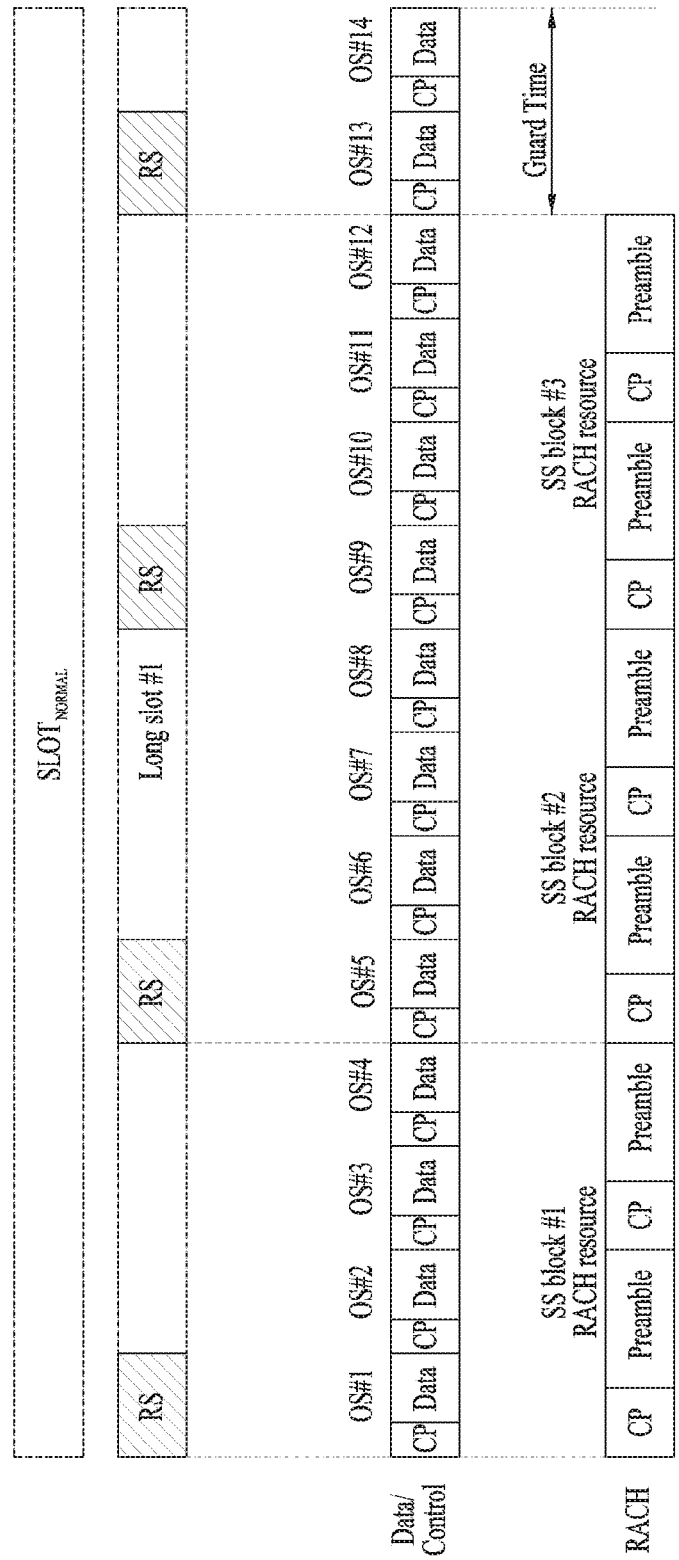
FIG. 15 illustrates an example of transmitting data by performing mini slot concatenation with the same length as a normal slot when BC holds.

FIG. 15 illustrates an example of transmitting data by performing mini slot concatenation with the same length as a normal slot when BC holds. Particularly, FIG. 15 illustrates transmission of concatenated mini slots and insertion of a reference signal during an RACH resource duration when BC holds. For example, one data packet may be transmitted throughout a long slot obtained by concatenating mini slots so that the long slot may have the same length as a normal slot. In this case, one data packet is dividedly transmitted in mini slots within the long slot.

Thus, in the case of data transmission using the concatenated mini slots, since the gNB forms an Rx beam of each RACH resource using information about an SS block transmission direction, the UE desirably transmits a signal in a direction capable of receiving each SS block with the best quality. Therefore, the gNB informs the UE of information related to Rx beam formation (e.g., information associated with the SS block) with respect to each OFDM symbol (when BC does not hold) or with respect to each RACH resource (when BC holds) in an RACH resource time region. In this case, smooth reception of the data channel may not be performed because the Rx beam of the gNB is changed during signal transmission while the UE performs signal transmission through concatenated mini slots and transmits a reference signal in a format defined for a normal slot. Therefore, it is necessary to insert the reference signal in a unit in which the Rx beam direction of the gNB varies in consideration of variation in the Rx beam direction of the gNB. To this end, a reference signal structure for the concatenated mini slots allocated in an RACH resource duration may be desirably defined. The UE to which the data or control channel of a concatenated mini slot format is allocated in the RACH resource duration should transmit the reference signal of the concatenated mini slot format.

During transmission of a PUSCH or a PUCCH, if one stable gNB Rx beam for a UE Tx beam direction of the PUSCH or the PUCCH is not present or a plurality of beams has similar quality, the PUSCH or a long PUCCH may be stably received by transmitting the PUSCH or the PUCCH through concatenated mini slots so as to use a beam diversity characteristic. In this case, the gNB may efficiently use a time resource to which an RACH resource is allocated by transmitting the PUSCH or the PUCCH in an RACH resource region.

Additionally, the gNB performs beam tracking for a Tx beam or an Rx beam so that a beam having the best quality is maintained as a serving beam in order to stably maintain a service in a multi-beam environment. Accordingly, the gNB may measure quality of the gNB Rx beam or the UE Tx beam and perform beam tracking by causing the UE to perform repetitive transmission of the PUSCH, the long PUCCH, or a short PUCCH in each RACH resource region or transmit an RS defined for beam tracking through a plurality of mini slots, using a characteristic in which the gNB changes the Rx beam in a slot duration to which the RACH resource is allocated. That is, for efficient use of a resource for beam tracking, the gNB may cause the UE to transmit a physical channel suitable for a characteristic for a time region to which the RACH resource is allocated and the gNB may use the physical channel as a resource for beam tracking. In other words, for efficient use of the resource for beam tracking, the gNB may indicate, to the UE, that the UE should transmit the physical channel through a UE Tx beam suitable for each of mini slot(s) configured in the time region to which the RACH resource is allocated and the gNB may use the physical channel in each mini slot for beam tracking. In order for the UE to efficiently transmit a signal for beam tracking, the gNB informs the UE of information about change in a beam direction as described above and the UE inserts a reference signal into each Rx beam of the gNB according to this information and a predefined rule and transmits the reference signal. The gNB may use the reference signal as a signal for channel estimation for an Rx beam duration or a signal for signal quality measurement for beam tracking.

Upon transmitting the PUSCH or the long PUCCH which is received in the gNB through beam diversity, since the gNB attempts to receive a signal in each Rx beam duration, antenna gain may have a different characteristic. Therefore, the UE may differently configure transmission power of the PUSCH/PUCCH with respect to each Rx beam direction (e.g., each RACH resource region). To this end, the gNB may inform the UE that reference channel/signal information and a power control parameter, for pathloss calculation used for open loop power control, should be separately configured with respect to each RACH resource region. The UE configures and transmits different transmission powers in an RACH resource time region using this information.

Unlike this, during transmission of a signal for beam tracking (or beam management) in a plurality of RACH resource regions, the respective RACH resource regions should maintain the same transmission power in order for a gNB to measure quality of a signal received by the gNB. In this case, only one reference channel/signal is needed for control of one power. If the gNB informs the UE of information about the reference channel/signal or the information is predefined by a rule, the UE may determine the magnitude of transmission power using the reference channel/signal and transmit the PUSCH/PUCCH by equally applying the transmission power to all regions.

The gNB may inform the UE of whether UL data or the control channel transmitted in an RACH resource transmission time region, i.e., a time region to which the RACH resource is configured in a corresponding cell, is used for beam diversity or for beam tracking with respect to each UL channel and cause the UE to perform a power control operation according to the above usage.

Figure 16:
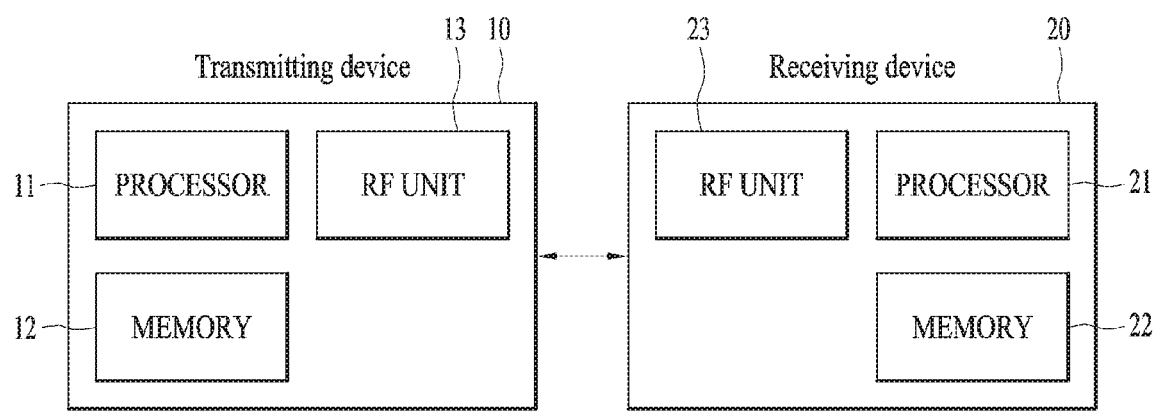
FIG. 16 is a block diagram illustrating elements of a transmitting device 10 and a receiving device 20 for implementing the present invention.

FIG. 16 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the present invention, the RF units 13 and 23 may support Rx BF and Tx BF. For example, in the present invention, the RF units 13 and 23 may be configured to perform the function illustrated in FIG. 3.

In the embodiments of the present invention, a UE operates as the transmitting device 10 in UL and as the receiving device 20 in DL. In the embodiments of the present invention, a gNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the gNB will be referred to as a gNB processor, a gNB RF unit, and a gNB memory, respectively.

The gNB processor of the present invention may configure an RACH preamble for a cell according to Method 1 or Method 2 of the present invention, based on RACH preamble detection capability thereof, cell coverage, and a subcarrier spacing of the RACH preamble. For example, the processor may configure the RACH preamble according to Method 2 of the present invention such that boundaries of an RACH resource occupied by the RACH preamble is aligned with boundaries of OFDM symbols in the time domain. The gNB processor may control the gNB RF unit to transmit information about configuration (e.g., a preamble format, a root sequence index, a sequence length, and/or cyclic shift unit ($N_{ZC}$)) of the RACH preamble for the cell. For example, the gNB processor may control the gNB RF unit to transmit the RACH preamble configuration information and control the gNB RF unit to monitor the RACH preamble on each RACH resource according to the RACH preamble configuration information. If any UE transmits the RACH preamble on the RACH resource, the gNB processor may detect the RACH preamble on the RACH resource. Meanwhile, if there is an RACH resource which is not used to transmit the RACH preamble among RACH resources configured by the gNB processor, the gNB processor may not detect the RACH preamble on the RACH resource. The gNB processor may perform reception/detection of the RACH preamble under the assumption that the RACH preamble in the RACH resource has been transmitted according to the RACH preamble configuration information. For example, the gNB processor may be configured to perform reception/detection of the RACH preamble under the assumption that a length $N_{RA}$ of the RACH preamble transmitted thereto in a cell to which the RACH preamble configuration is applied is equal to a total length of OFDM symbols used to receive the RACH preamble and the RACH preamble includes a sequence part having a length $N_{SEQ}$ and a CP having a length $N_{CP,RA}$. Herein, the sequence part includes n preambles (where n is a positive integer) each having a length $N_u$, $N_{SEQ}=N_u*n$, and $N_{CP,RA}+N_{SEQ}=N_{RA}$. The gNB processor may control the gNB RF unit to attempt to perform reception/detection of the RACH preamble under the assumption that the RACH preamble spans the OFDM symbols from start to end of the OFDM symbols in the time domain.

The UE processor of the present invention may be configured to generate the RACH preamble according to RACH preamble configuration of the cell upon transmitting the RACH preamble on the cell and control the UE RF unit to transmit the RACH preamble on the RACH resource. For example, the UE processor may control the UE RF unit to receive the RACH preamble configuration information (e.g., a preamble format, a root sequence index, a sequence length, and/or a cyclic shift unit ($N_{ZC}$)). If an RACH procedure needs to be performed, the UE processor may control the UE RF unit to generate the RACH preamble according to the RACH preamble configuration information and transmit the RACH preamble on an RACH resource associated with a (specific) SS block (or selected according to a specific criterion). For example, the UE processor may generate the RACH preamble such that the length $N_{RA}$ of the RACH preamble transmitted in a cell to which the RACH preamble configuration is applied is equal to a total length of the OFDM symbols used to receive the RACH preamble. The UE processor may generate the RACH preamble such that the RACH preamble includes a sequence part having a length $N_{SEQ}=N_u*n$, which includes n preambles (where n is a positive integer) each having a length $N_u$, and a CP having a length $N_{CP,RA}$ satisfying $N_{CP,RA}+N_{SEQ}=N_{RA}$. The UE processor may generate the RACH preamble such that the OFDM symbols are spanned in the time domain from start to end of the OFDM symbols. The UE processor may control the UE RF unit to transmit the RACH preamble by spanning the OFDM symbols in the time domain from start to end of the OFDM symbols.

The gNB processor of the present invention may configure mini slots according to any one of mini slot allocation methods (and mini slot concatenation methods) of the present invention. The gNB processor may control the gNB RF unit to transmit information about configuration of the mini slots. The gNB processor may be configured to schedule a PUCCH or a PUSCH for any one of the mini slots. The gNB processor may control the gNB RF unit to transmit scheduling information about mini slot(s) according to the mini slot allocation methods of the present invention. The UE processor of the present invention may control the UE RF unit to receive the configuration information about the mini slots. The UE processor may control the UE RF unit to receive the scheduling information about the mini slot(s) configured according to the configuration information. The UE processor may control the UE RF unit to transmit the PUSCH or the PUCCH in the mini slot based on the scheduling information.

The gNB processor or the UE processor of the present invention may be configured to apply the present invention in a cell operating in a high frequency band of 6 GHz or higher on which analog or hybrid BF is used.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method of transmitting a random access channel (RACH) preamble by a user equipment in a wireless communication system, the method comprising:
generating the RACH preamble; and
transmitting the RACH preamble on a RACH resource,
wherein the RACH resource corresponds to a plurality of orthogonal frequency division multiplexing (OFDM) symbols in a time domain,
wherein a length $N_{RA}$ of the RACH preamble is equal to a total length $N_{RA,symbols}$ of the plurality of OFDM symbols,
wherein the RACH preamble consists of one cyclic prefix (CP) part and one sequence part following the CP part in the time domain,
wherein the RACH preamble is accompanied by no guard time,
wherein the sequence part includes n preambles, each preamble having a length $N_u$, and a length $N_{SEQ}$ of the sequence part is $N_u*n$, where n is a positive integer,
wherein a length $N_{CP,RA}$ of the CP part is greater than a length of a CP portion of an OFDM symbol so as to satisfy $N_{CP,RA}+N_{SEQ}=N_{RA,symbols}$, and
wherein the RACH preamble spans the plurality of OFDM symbols from start to end of the plurality of OFDM symbols in the time domain.

2. The method according to claim 1, wherein $N_u$ is a fixed value.

3. The method according to claim 1, further comprising:
receiving information on a random access preamble format, wherein the RACH preamble is generated in accordance with the random access preamble format.

4. The method according to claim 1, wherein the wireless communication system is a system to which reception beamforming by a base station is applicable per OFDM symbol.

5. A method of receiving a random access channel (RACH) preamble by a base station in a wireless communication system, the method comprising:
transmitting RACH preamble configuration information; and
receiving the RACH preamble on a RACH resource based on the RACH preamble configuration information,
wherein the RACH resource corresponds to a plurality of orthogonal frequency division multiplexing (OFDM) symbols in a time domain,
wherein a length $N_{RA}$ of the RACH preamble is equal to a total length $N_{RA,symbols}$ of the plurality of OFDM symbols, and
wherein the RACH preamble consists of one cyclic prefix (CP) part and one sequence part following the CP part in the time domain,
wherein the RACH preamble is accompanied by no guard time,
wherein the sequence part includes n preambles, each preamble having a length $N_u$, and a length $N_{SEQ}$ of the sequence part is $N_u*n$, where n is a positive integer,
wherein a length $N_{CP,RA}$ of the CP part is greater than a length of a CP portion of an OFDM symbol so as to satisfy $N_{CP,RA}+N_{SEQ}=N_{RA,symbols}$, and
wherein the RACH preamble spans the plurality of OFDM symbols from start to end of the plurality of OFDM symbols in the time domain.

6. The method according to claim 5, wherein $N_u$ is a fixed value.

7. The method according to claim 5,
wherein the RACH preamble configuration information includes a random access preamble format, and
wherein the RACH preamble is received in accordance with the random access preamble format.

8. The method according to claim 5, wherein the wireless communication system is a system to which reception beamforming by the base station is applicable per OFDM symbol.

9. A user equipment for transmitting a random access channel (RACH) preamble in a wireless communication system, the user equipment comprising,
a transceiver,
a processor, and
a memory operably connectable to the processor and storing instructions that, when executed, cause the processor to perform operations comprising:
generating the RACH preamble; and
transmitting, via the transceiver, the RACH preamble on a RACH resource,
wherein the RACH resource corresponds to a plurality of orthogonal frequency division multiplexing (OFDM) symbols in a time domain,
wherein a length $N_{RA}$ of the RACH preamble is equal to a total length $N_{RA,symbols}$ of the plurality of OFDM symbols following the CP part in the time domain,
wherein the RACH preamble consists of one cyclic prefix (CP) part and one sequence part,
wherein the RACH preamble is accompanied by no guard time,
wherein the sequence part includes n preambles, each preamble having a length $N_u$, and a length $N_{SEQ}$ of the sequence part is $N_u*n$, where n is a positive integer,
wherein a length $N_{CP,RA}$ of the CP part is greater than a length of a CP portion of an OFDM symbol so as to satisfy $N_{CP,RA}+N_{SEQ}=N_{RA,symbols}$, and
wherein the RACH preamble spans the plurality of OFDM symbols from start to end of the plurality of OFDM symbols in the time domain.

10. The user equipment according to claim 9, wherein $N_u$ is a fixed value.

11. The user equipment according to claim 9, wherein the operations further comprise:
receiving, via the transceiver, information on a random access preamble format, and
generating the RACH preamble in accordance with the random access preamble format.

12. The user equipment according to claim 9, wherein the wireless communication system is a system to which reception beamforming by a base station is applicable per OFDM symbol.

13. A base station for receiving a random access channel (RACH) preamble in a wireless communication system, the base station comprising,
a transceiver,
a processor, and
a memory operably connectable to the processor and storing instructions that, when executed, cause the processor to perform operations comprising:
transmitting, via the transceiver, RACH preamble configuration information; and
receiving, via the transceiver, the RACH preamble on a RACH resource based on the RACH preamble configuration information,
wherein the RACH resource corresponds to a plurality of orthogonal frequency division multiplexing (OFDM) symbols in a time domain, wherein a length $N_{RA}$ of the RACH preamble is equal to a total length $N_{RA,symbols}$ of the plurality of OFDM symbols, wherein the RACH preamble consists of one cyclic prefix (CP) part and one sequence part following the CP part in the time domain, wherein the RACH preamble is accompanied by no guard time, wherein the sequence part includes n preambles, each preamble having a length $N_u$, and a length $N_{SEQ}$ of the sequence part is $N_u*n$, where n is a positive integer, wherein a length $N_{CP,RA}$ of the CP part is greater than a length of a CP portion of an OFDM symbol so as to satisfy $N_{CP,RA}+N_{SEQ}=N_{RA,symbols}$, and wherein the RACH preamble spans the plurality of OFDM symbols from start to end of the plurality of OFDM symbols in the time domain.

14. The base station according to claim 13, wherein $N_u$ is a fixed value.

15. The base station according to claim 13,
wherein the RACH preamble configuration information includes a random access preamble format, and
wherein the operations further comprise: receiving, via the transceiver, the RACH preamble in accordance with the random access preamble format.

16. The base station according to claim 13, wherein the wireless communication system is a system to which reception beamforming is applicable per OFDM symbol.

* * * * *